US012762587B2

(12) United States Patent
Bogolea et al.

(10) Patent No.: US 12,762,587 B2
(45) Date of Patent: *Oct. 13, 2026

(54) METHOD FOR TRACKING AND MAINTAINING PROMOTIONAL STATES OF SLOTS IN INVENTORY STRUCTURES WITHIN A STORE

(71) Applicant: Simbe Robotics, Inc., South San Francisco, CA (US)

(72) Inventors: Bradley Bogolea, South San Francisco, CA (US); Jariullah Safi, South San Francisco, CA (US); Lorin Vandegrift, South San Francisco, CA (US); Shiva Reddy, South San Francisco, CA (US); Tom Gehani, South San Francisco, CA (US)

(73) Assignee: Simbe Robotics, Inc., Burlingame, CA (US)

( * ) Notice: Subject to any disclaimer, the term of this patent is extended or adjusted under 35 U.S.C. 154(b) by 251 days.

This patent is subject to a terminal disclaimer.

(21) Appl. No.: 18/777,452

(22) Filed: Jul. 18, 2024

(65) Prior Publication Data

US 2024/0370900 A1 Nov. 7, 2024

Related U.S. Application Data

(63) Continuation of application No. 17/403,782, filed on Aug. 16, 2021, now Pat. No. 12,073,431, which is a (Continued)

(51) Int. Cl.

| | |
|---|---|
| ***G06Q 30/0241*** | (2023.01) |
| ***G06F 18/22*** | (2023.01) |

(Continued)

(52) U.S. Cl.

CPC ......... *G06Q 30/0248* (2013.01); *G06F 18/22* (2023.01); *G06Q 10/087* (2013.01); *G06Q 20/201* (2013.01); *G06V 20/52* (2022.01)

(58) Field of Classification Search

CPC ............. G06Q 30/0248; G06Q 10/087; G06Q 20/201; G06Q 10/08724; G06Q 10/08726;

(Continued)

(56) References Cited

U.S. PATENT DOCUMENTS

| | | | | |
|---|---|---|---|---|
| 7,475,205 B2 * | 1/2009 | McIntosh | G11B 27/11 | 711/170 |
| 7,610,233 B1 * | 10/2009 | Leong | G06Q 10/087 | 705/28 |

(Continued)

FOREIGN PATENT DOCUMENTS

| | | | |
|---|---|---|---|
| WO | WO-0073930 A2 * | 12/2000 | G06T 11/26 |
| WO | WO-2013138193 A2 * | 9/2013 | G06Q 10/087 |

*Primary Examiner* — Mahendra R Patel

(74) *Attorney, Agent, or Firm* — Run8 Patent Group, LLC; Peter Miller; Leah Raddatz

(57) ABSTRACT

One variation of a method for tracking promotional states of slots in inventory structures within a store includes: accessing an image of an inventory structure within a store; detecting a shelf tag on the inventory structure in the image; extracting a set of features from the shelf tag detected in the image; detecting a promotional tag on the inventory structure in the image; extracting a set of features from the promotional tag detected in the image; detecting a deviation between the shelf tag and the promotional tag based on a difference between the sets of features; and, in response to (Continued)

detecting the deviation between the shelf tag and the promotional tag, identifying the first promotional tag as erroneous, and notifying a store associate to replace the first promotional tag with a second promotional tag at the first slot, the second promotional tag correcting the difference.

20 Claims, 6 Drawing Sheets

Related U.S. Application Data continuation of application No. 17/169,326, filed on Feb. 5, 2021, now Pat. No. 11,126,962.

(60) Provisional application No. 62/970,695, filed on Feb. 5, 2020.

(51) Int. Cl.

| | |
|---|---|
| ***G06Q 10/087*** | (2023.01) |
| ***G06Q 20/20*** | (2012.01) |
| ***G06V 20/52*** | (2022.01) |

(58) Field of Classification Search

CPC .......... G06Q 10/0877; G06Q 10/08744; G06F 18/22; G06V 20/52; G05D 2105/93; G05D 2107/67; G05D 2109/10; G05D 1/646

USPC .......................................................... 705/14.4

See application file for complete search history.

(56) References Cited

U.S. PATENT DOCUMENTS

| | | | | | |
|---|---|---|---|---|---|
| 8,098,888 | B1 * | 1/2012 | Mummareddy | G06V 20/53 | 382/103 |
| 8,321,303 | B1 * | 11/2012 | Krishnamurthy | G06Q 30/02 | 705/28 |
| 8,326,451 | B2 * | 12/2012 | Schantz | G01S 13/751 | 700/229 |
| 8,676,937 | B2 * | 3/2014 | Rapaport | H04L 67/306 | 709/219 |
| D819,712 | S * | 6/2018 | Gee | D15/199 | |
| 2008/0077511 | A1 * | 3/2008 | Zimmerman | G06Q 10/087 | 705/28 |
| 2008/0167106 | A1 * | 7/2008 | Lutnick | G07F 17/3286 | 463/16 |
| 2014/0019314 | A1 * | 1/2014 | Nordman | G06Q 20/203 | 705/28 |
| 2014/0279294 | A1 * | 9/2014 | Field-Darragh | G06Q 10/087 | 705/28 |
| 2014/0361077 | A1 * | 12/2014 | Davidson | G06Q 10/087 | 235/385 |
| 2015/0310601 | A1 * | 10/2015 | Rodriguez | G06Q 20/208 | 348/150 |
| 2017/0124511 | A1 * | 5/2017 | Mueller | G06Q 10/0837 | |
| 2018/0293543 | A1 * | 10/2018 | Tiwari | H04W 4/35 | |
| 2019/0043003 | A1 * | 2/2019 | Fisher | G06Q 10/087 | |
| 2020/0013007 | A1 * | 1/2020 | Bogolea | G05D 1/0274 | |

* cited by examiner

S100

S110
IMAGE DATABASE
S120
S130
"SHELF FACE"
S142
SKU 11874622
$8.99
DETERGENT
PRODUCT TYPE
S164
INSTALL MISSING PROMO TAG @ AISLE 4, STRUCTURE 2, SLOT 11
MISSING PROMO TAG
PROMOTION DATABASE
CURRENT PROMO!
ACME DETERGENT
SKU: 11874622
PRICE: $8.99
PROMOTION: "BUY 1, GET 1 FREE"
DATE: 2/1 ONLY
S144
S148
PROMO TAG DETECTOR
S162
ERROR!

METHOD FOR TRACKING AND MAINTAINING PROMOTIONAL STATES OF SLOTS IN INVENTORY STRUCTURES WITHIN A STORE

CROSS-REFERENCE TO RELATED APPLICATIONS

This application is a continuation of U.S. patent application Ser. No. 17/403,782, filed on 16 Aug. 2021, which is a continuation of U.S. patent application Ser. No. 17/169,326, filed on 5 Feb. 2021, which claims priority to U.S. Provisional Patent Application No. 62/970,695, filed on 5 Feb. 2020, each of which is incorporated in its entirety by this reference.

This application is related to U.S. patent application Ser. No. 15/600,527, filed on 19 May 2017, which is incorporated in its entirety by this reference.

TECHNICAL FIELD

This invention relates generally to the field of stock keeping and more specifically to a new and useful method for tracking and maintaining promotional states of slots in inventory structures within a store in the field of stock keeping.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1A:
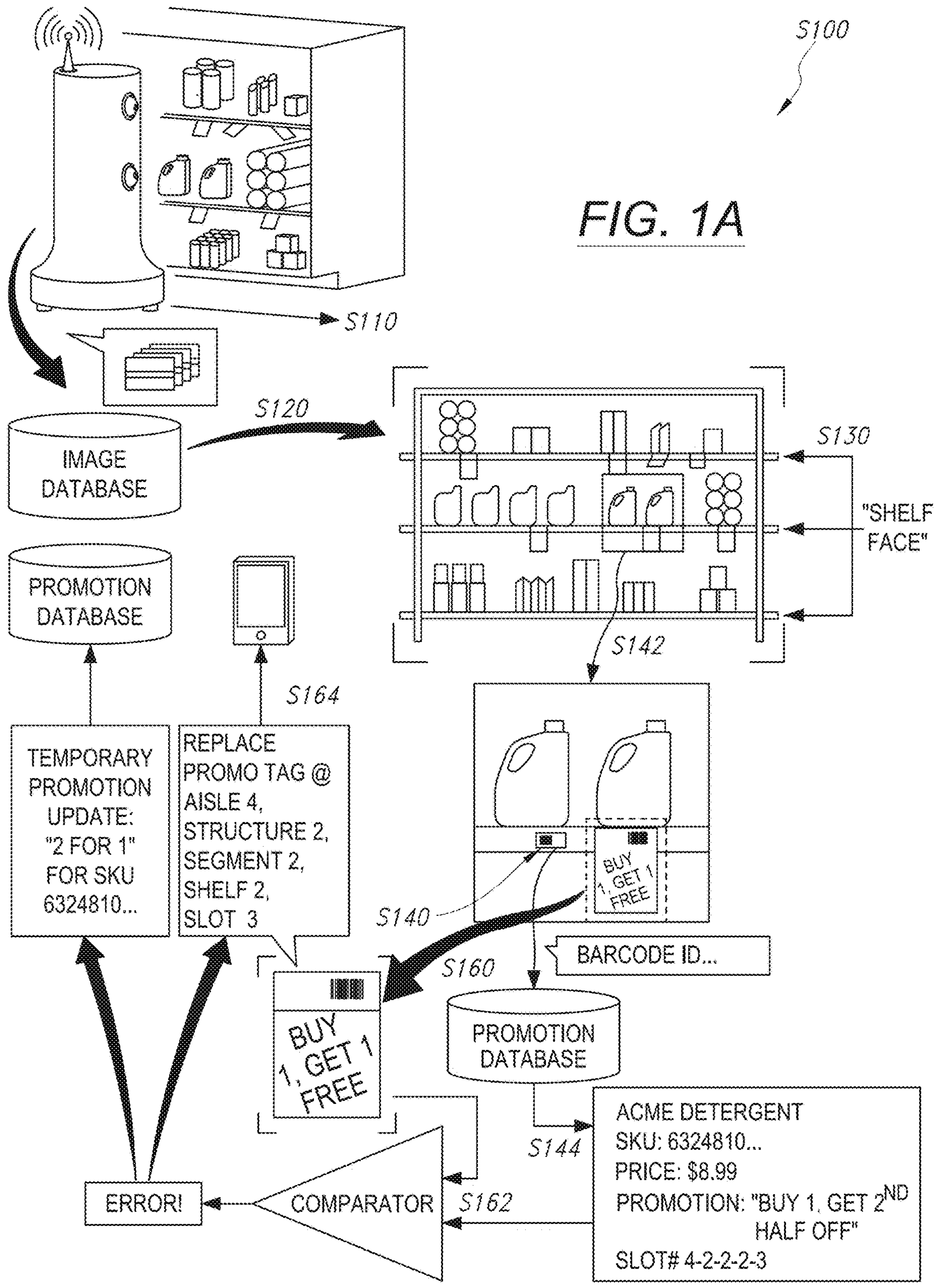
FIGS. 1A, 1B, and 1C are flowchart representations of a method.
Figure 1B:
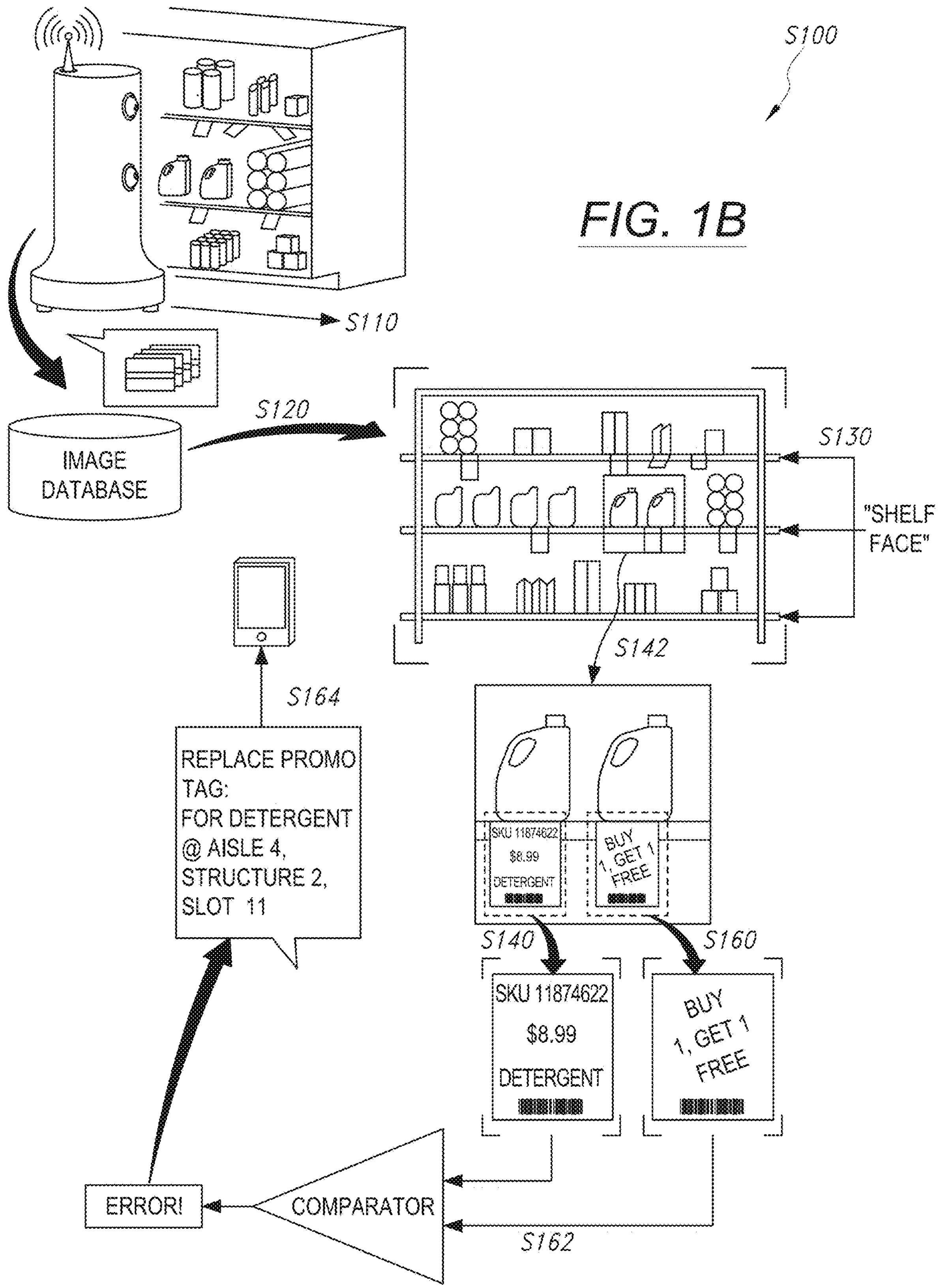
Figure 1C:
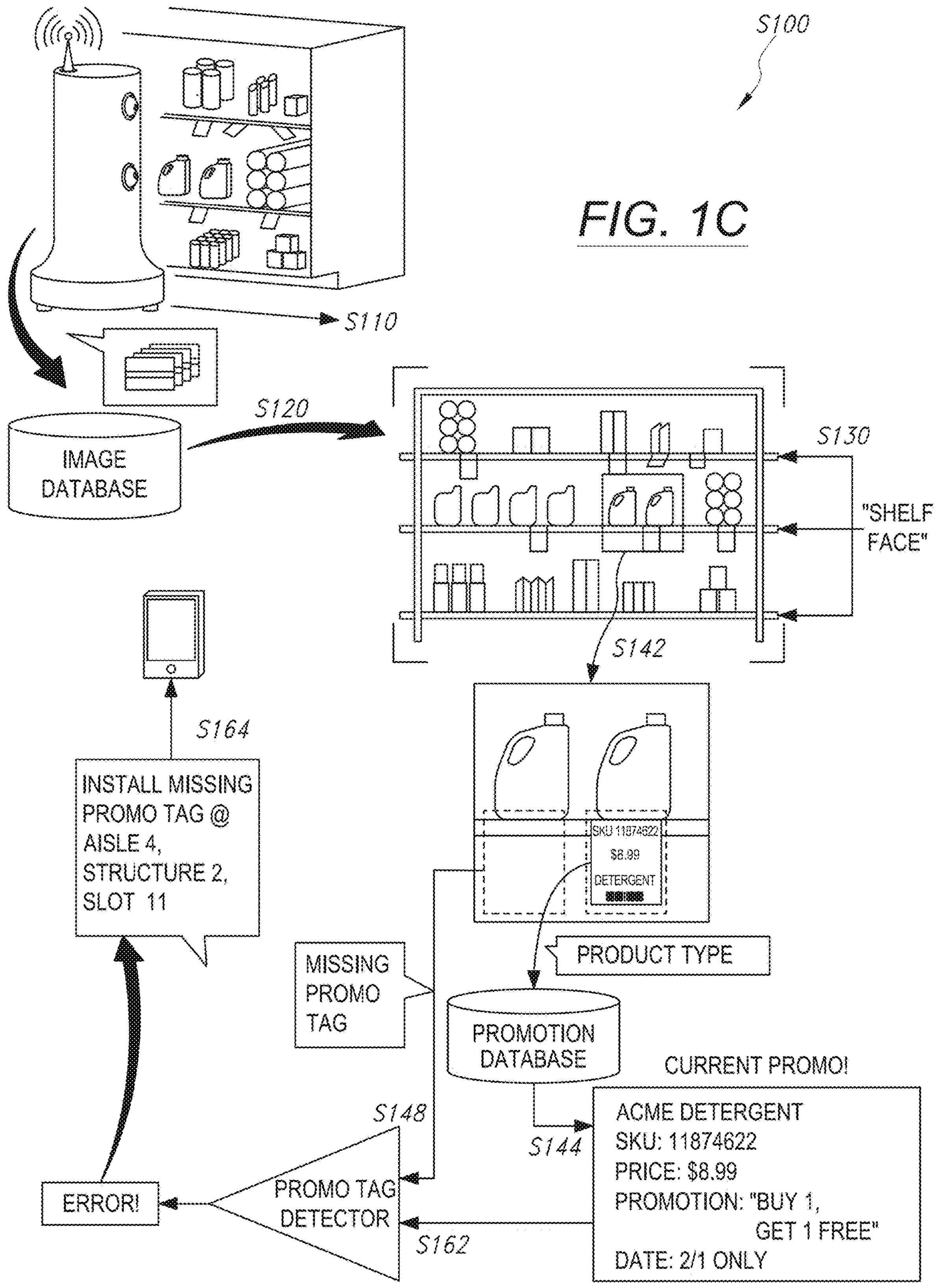
Figure 2A:
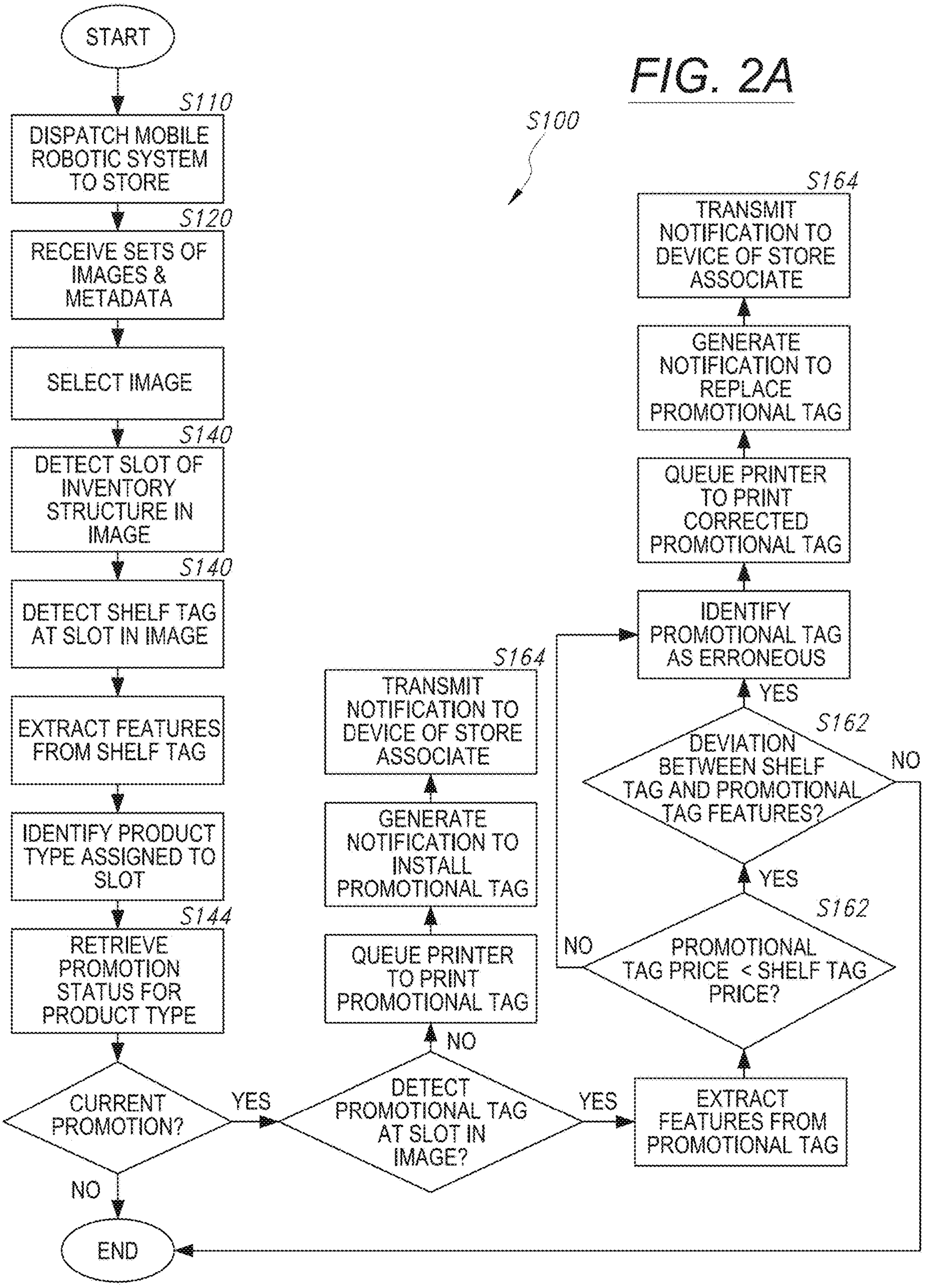
FIGS. 2A and 2B are flowchart representations of a method.
Figure 2B:
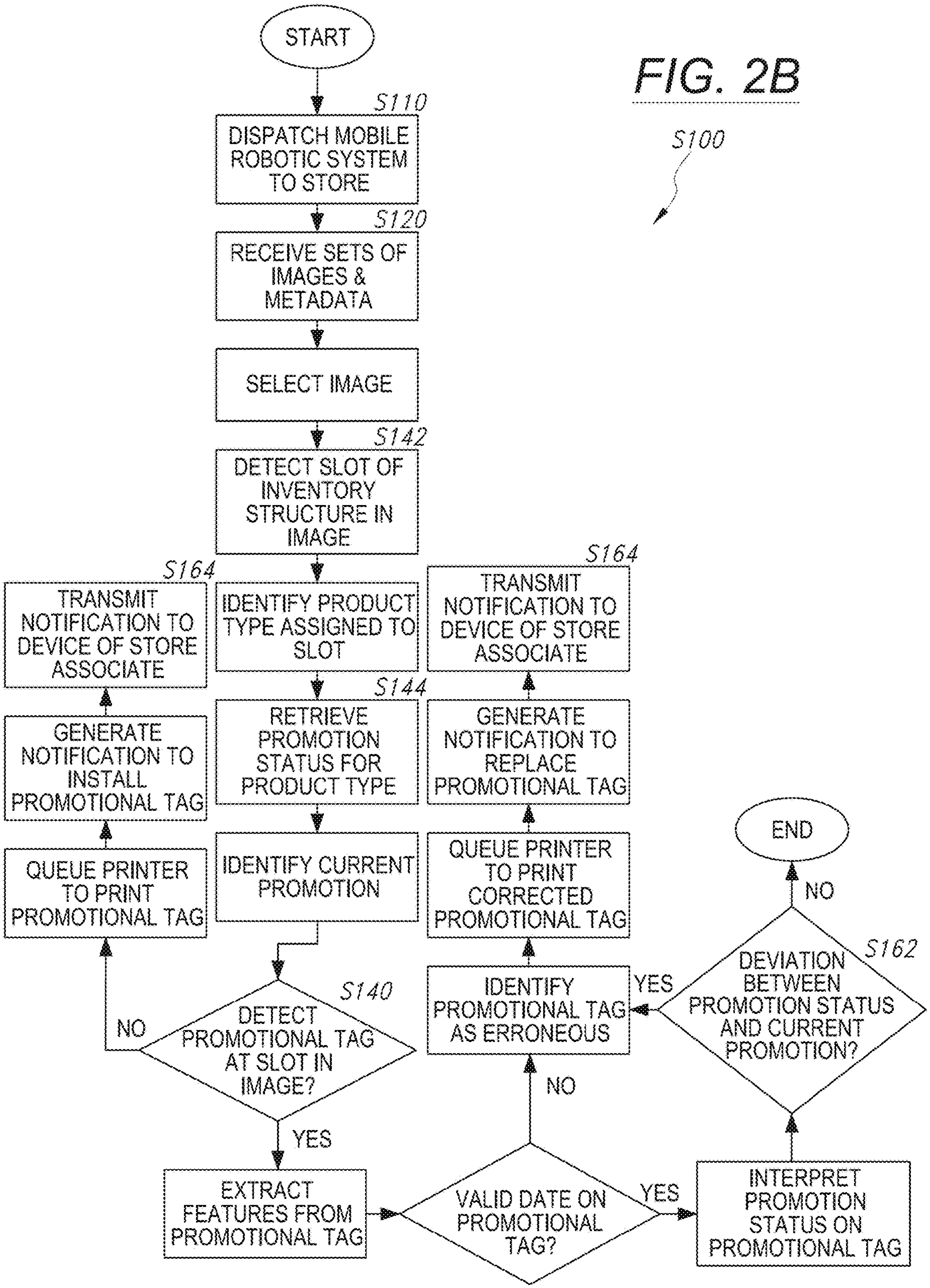

As shown in FIGS. 1-2, a method S100 for tracking and maintaining promotional states of slots in inventory structures within a store includes: dispatching a robotic system to autonomously navigate throughout a store and to record images of inventory structures within the store during a scan cycle in Block S110; accessing an image of an inventory structure captured by the robotic system during the scan cycle in Block S120; detecting a set of shelf faces, in the inventory structure, depicted in the image in Block S130; detecting a first shelf tag on a first shelf face, in the set of shelf faces, in the image in Block S140; delineating a first slot above the first shelf face based on a position of the first shelf tag in the image in Block S142; retrieving a promotion status of the first slot based on data extracted from the first shelf tag in Block S144; scanning a first region of the image proximal the first shelf tag for a promotional tag in Block S150; and, in response to the promotion status of the first slot indicating an active promotion for a first product assigned to the first slot and in response to detecting absence of the promotional tag proximal the first shelf tag, transmitting a prompt to a store associate to place a new promotional tag proximal the first slot in Block S160.

One variation of the method S100 includes, in response to the promotion status of the first slot indicating an active promotion for a first product assigned to the first slot and, in response to detecting presence of the promotional tag proximal the first shelf tag in the image, comparing published promotion data read from the promotional tag to promotion parameters assigned to the first slot by a planogram or promotion schedule of the store in Block S162; and, in response to a deviation between published promotion data read from the promotional tag and promotion parameters assigned to the first slot, dispatching the store associate to remove and/or replace the promotional tag at the first slot in Block S164.

Another variation of the method S100 includes: accessing an image of an inventory structure within the store in Block S120; detecting a first shelf tag on the inventory structure in the image in Block S130; extracting a first set of features from the first shelf tag detected in the image in Block S140; identifying a first slot, in the inventory structure, corresponding to the shelf tag in Block S142; detecting a first promotional tag on the inventory structure in the image in Block S160; extracting a second set of features from the first promotional tag detected in the image; associating the first promotional tag with the first shelf tag; detecting a deviation between the first shelf tag and the first promotional tag based on a difference between the first set of features and the second set of features in Block S162; in response to detecting the deviation between the first shelf tag and the first promotional tag, identifying the first promotional tag as erroneous, and generating a prompt to replace the first promotional tag with a second promotional tag at the first slot, the second promotional tag correcting the difference; and transmitting the prompt to a computing device associated with a store associate in Block S164.

Yet another variation of the method S100 includes: accessing an image of an inventory structure within a store in Block S120; detecting a first slot in the inventory structure depicted in the image in Block S142; identifying a first product type assigned to the first slot; retrieving, from a promotion schedule, a current promotion status assigned to the first product type in Block S144; detecting a first promotional tag in the image in Block S160; associating the first promotional tag with the first slot; extracting a first set of features from the first promotional tag detected in the image; interpreting a first promotion status advertised by the first promotional tag based on the first set of features; detecting a conflict between the first promotion status and the current promotion status in Block S162; in response to detecting the conflict, flagging the first promotional tag, and generating a notification to investigate the first promotional tag at the first slot; and transmitting the notification to a computing device associated with a store associate in Block S164.

Another variation of the method S100 includes: accessing an image of an inventory structure within a store in Block S120; detecting a set of shelf faces in the inventory structure in the image; detecting a shelf tag on a first shelf face, in the set of shelf faces, in the image in Block S130; delineating a slot above the first shelf face based on a position of the shelf tag in the image in Block S142; identifying a product type assigned to the slot; retrieving, from a promotion schedule, a current promotion status associated with the product type in Block S144; detecting an absence of a promotional tag indicating the current promotion status at the slot in the image in Blocks S148 and S162; in response to detecting the absence of the promotional tag, generating a notification to install the promotional tag at the slot; and transmitting the notification to a computing device associated with a store associate in Block S164.

2. Applications

Generally, Blocks of the method S100 can be executed by a computer system: to dispatch a robotic system to capture images of products arranged on shelves throughout a retail space (e.g., a grocery store); to interpret stock conditions of slots on shelves in inventory structures throughout the store based on images captured by the robotic system; to retrieve promotion statuses of slots in the inventory structure occupied by these products; to detect and read published promotion data from promotional tags (e.g., temporary paper or cardstock "hang tags" adhered near shelf tags on vertical shelf faces) near these slots in the inventory structure; and to verify that the published promotion data read from promotional tags matches promotion statuses assigned to these slots. Responsive to detecting a deviation between published promotion data read from a particular promotional tag and a promotion status assigned to a corresponding slot, the computer system transmits a prompt or notification to a computing device associated with a store associate to remove and/or replace this particular promotional tag at this particular slot in order to reduce or eliminate specious promotional tags in the store.

For example, a store may implement a policy of honoring promotional prices indicated on promotional tags in the store or a policy of not charging for any product rung up with an incorrect price at checkout. Furthermore, a discrepancy between a patron's expectation of the price of a product—such as read from a promotional tag—and a price of the product shown at checkout may increase patron frustration, reduce patron satisfaction with the store, and reduce return visits to the store. Therefore, discrepancies between scheduled promotions of products in the store and actual details of these promotions published on promotional tags arranged throughout the store may yield negative long-term effects in the store.

Therefore, the computer system executes Blocks of the method S100 to retrieve images of inventory structures through the store, detect promotional tags and corresponding slots or products in the inventory structure, and to verify that promotion details read from these promotional tags match scheduled promotions for corresponding products throughout the store. The computer system dispatches store associates to install, remove, and/or replace promotional tags throughout the store responsive to detecting erroneous promotional tags, such as missing promotional tags, expired promotional tags, or tags with incorrect promotion details. The computer system thus serves contextual promotional tag guidance to store associates based on promotion details read from images of promotional tags on inventory structures throughout the store, thereby enabling store associates to quickly correct missing, expired, and erroneous promotional tags and enabling the store more generally to manage and meet product pricing expectations of its patrons.

2.1 Example: Direct Tag Comparison

In one example, the computer system verifies information advertised on a promotional tag positioned on an inventory structure in a store by comparing the information on the promotional tag with information on a corresponding shelf tag positioned on the inventory structure and identifying an alignment of information between the shelf tag and the promotional tag. In the event of a misalignment between the shelf tag and the promotional tag, the computer system can generate and transmit a notification or prompt to a computing device of a store associate so that the store associate may take corrective action, thus ensuring that promotional information advertised throughout the store is current, accurate, and valid, thereby improving customer experience and maintaining customer satisfaction while shopping in the store.

Specifically, a robotic system can autonomously navigate throughout the store to capture photographic images of inventory structures during a scan cycle of the store. The robotic system can then upload the photographic images to a remote database via a wireless network. The computer system can then access a photographic image—captured by the robotic system during the scan cycle—from the remote database; and implement computer vision techniques (e.g., template matching, object recognition) to detect a shelf face, a row of shelf tags on the shelf face, and a row of promotional tags on the shelf face. The computer system can then link each shelf tag detected on the shelf face to a corresponding promotional tag.

In one variation, the computer system can retrieve a promotional tag rule defined by the store, such as that promotional tags are located immediately to the right of their corresponding shelf tags, that promotional tags are located immediately below their corresponding shelf tags, and/or that promotional tags are located within a threshold distance of their corresponding shelf tags. The computer system can then link a shelf tag and a promotional tag based on this promotional tag rule and relative positions of these promotional tags and shelf tags. Additionally or alternatively, the computer system can characterize distances between promotional tags and shelf tags on the shelf face and link a promotional tag to a shelf tag located within the threshold distance on the same shelf face. In another variation, the computer system can link a promotional tag to a shelf tag based on features that are extracted from the promotional tag and the shelf tag (e.g., a matching bar code, product identifier, or other identifying feature described herein). In another variation, the computer system can link a promotional tag to a shelf tag based on some combination of corresponding features between the promotional tag and the shelf tag and a promotional tag rule.

The computer system can extract a first set of features from the shelf tag, such as including price, product identifier, bar code, stock-keeping unit (SKU), product description, nutritional values (e.g., "gluten free," "vegan," "wheat free," "dairy free," "organic," "non-GMO," "soy free," "no added sugar," and other relevant nutritional information), geometry features of the shelf tag (e.g., a rectangular or round shape, whether a portion of the shelf tag is torn and/or bent), and other relevant information on the shelf tag. The computer system can then extract a second set of features from the promotional tag, such as including a product identifier, bar code, SKU, product description, price, nutritional values (e.g., "gluten free," "vegan," "wheat free," "dairy free," "organic," "non-GMO," "soy free," "no added sugar," and other relevant nutritional information), promotion status (specifying a promotion format and/or corresponding promotion parameters, such as a duration, date, or range of dates in which the promotion is valid), geometry features of the promotional tag (e.g., a rectangular or round shape, whether a portion of the shelf tag is torn or bent), and other relevant information on the promotional tag.

The computer system can compare the first set of features extracted from the shelf tag and the second set of features extracted from the promotional tag to verify alignment between the shelf tag and the promotional tag. In particular, the computer system can verify that the published promotion data advertised by the promotional tag is accurate and appropriate based on the information on the shelf tag (e.g., the SKUs match, the price advertised by the promotional tag is less than or offers a better value than the price advertised by the shelf tag) and is valid based on the promotion status associated with the promotional tag (e.g., the promotion is ongoing for the current date(s), the promotion status advertised is accurate based on a promotion schedule). In some example implementations, the computer system detects a deviation between the shelf tag and the promotional tag based on a difference between the first set of features and the second set of features (e.g., the SKUs do not match indicating that the shelf tag and/or the promotional tag is placed incorrectly within the store, a price from the promotional tag matches or exceeds the price from the shelf tag, the promotion status for the promotional tag is incorrect or has expired, a geometry of the promotional tag is not consistent with any promotional tag templates and/or deviates from a specified promotional tag template, which may indicate that the promotional tag is erroneous, bent, torn, or misshapen in some way). In response to detecting the deviation between the first shelf tag and the first promotional tag, the computer system can generate a notification or prompt to investigate, remove, and/or replace the promotional tag based on the type of deviation detected and transmit the notification or prompt to a computing device associated with a store associate so that the store associate may perform an appropriate corrective action regarding the promotional tag (e.g., removing the promotional tag and/or replacing the promotional tag with a corrected promotional tag).

2.2 Example: Promotion Schedule

In another example, the computer system can verify information advertised on a promotional tag positioned on an inventory structure in a store by comparing the promotion data advertised by the promotional tag with information on a promotion schedule that lists current promotion statuses (comprising a promotion format and corresponding promotion parameters for product types found within the store). In some example implementations, in order to create the promotion schedule, the computer system can scan a digital product catalog (e.g., a product website for the store) or a manifest and compile promotion formats and corresponding promotion parameters for each product type in the store.

In order to verify the accuracy of the information advertised on the promotional tag, the computer system can: access a photographic image—captured by the robotic system during the scan cycle—from the remote database; and implement computer vision techniques (e.g., template matching, object recognition) to detect a slot in an inventory structure and a promotional tag on the inventory structure in the photographic image. The computer system can then identify a product type assigned to the slot detected in the photographic image and retrieve, from the promotion schedule, a current promotion status assigned to the slot. The computer system can then extract a set of features from the promotional tag, such as including a product identifier, bar code, SKU, product description, price, nutritional attributes, promotion status, geometry features of the promotional tag (e.g., a rectangular or round shape, whether a portion of the shelf tag is torn or bent), and other relevant information on the promotional tag. The computer system can interpret the promotion status advertised by the promotional tag based on the set of features. In some example implementations, the computer system can perform an initial "gut check" and verify that the promotion date(s) of the promotion status is current (i.e., the promotional tag is valid and the specified date or date range is not incorrect, expired, or already passed). Once verified, the computer system can compare the promotion status extracted from the promotional tag to the current promotion status retrieved from the promotion schedule. The computer system can verify the promotion format (e.g., "buy [X] quantity, get [Y] quantity free," "buy [X] quantity, get [Y] quantity [Z] % off," "[X] % discount"), the accuracy, and the validity (i.e., the promotion date(s) is not incorrect, expired, or already passed) of the promotion status advertised by the promotional tag based on the current promotion status.

In response to detecting a conflict between the extracted promotion status and the current promotion status, the computer system can generate a notification or prompt to investigate, remove, and/or replace the promotional tag based on the type of conflict detected and transmit the notification or prompt to a computing device associated with a store associate so that the store associate may take action to correct the promotional tag (e.g., removing the promotional tag and/or replacing the promotional tag with a second promotional tag indicating the current promotion status).

In some example implementations, the computer system can: identify the product type assigned to the slot detected in the photographic image based on a shelf tag detected in the image that corresponds to the promotional tag; extract information from the shelf tag; and identify the product type indicated by the shelf tag. In the event that the computer system detects an absence of a shelf tag corresponding to the promotional tag or that the corresponding shelf tag is obscured by an object (e.g., another shelf tag, a promotional tag, a product, an inventory structure, or other similar objects) or is torn or misshapen in some way, the computer system can access a planogram of the store that indicates product type and placement within the store. In some example implementations, the computer system can verify a presence and/or accuracy of promotional tags placed on inventory structures within the store, independent of whether corresponding shelf tags are present on the inventory structures.

2.3 Example: Promotional Tag Absence

In one example, the computer system can identify an absence of a promotional tag at a slot in an inventory structure that stores a product type with a current promotion status and generate and transmit a notification or prompt to a computing device of a store associate so that the store associate may take action to place a promotional tag at the appropriate slot.

The computer system can: access a photographic image—captured by the robotic system during the scan cycle—from the remote database; and implement computer vision techniques (e.g., template matching, object recognition) to detect a shelf face and a row of shelf tags on the shelf face. Based on the position of a shelf tag in the image, the computer system can delineate a slot above the shelf face. The computer system can identify a product type assigned to the slot by accessing a planogram of the store or by extracting a set of features from the shelf tag and then retrieve, from a promotion schedule, a current promotion status associated with the product type (indicating that a promotion is ongoing for the product type on the current date). In response to detecting the absence of a corresponding promotional tag at the slot or near a shelf tag detected in the image, the computer system can generate and transmit a notification to a computing device associated with a store associate to install the promotional tag at the slot. By ensuring that promotional tags are displayed for product types with current, ongoing promotions, the store may experience a boost in overall sales of the product type as customers may be more likely to purchase the product type when it is on sale and may potentially introduce customers to a new product type who may not have otherwise tried the new product type at full price, thereby earning new customers as fans of the product type.

3. System

Figure 3:
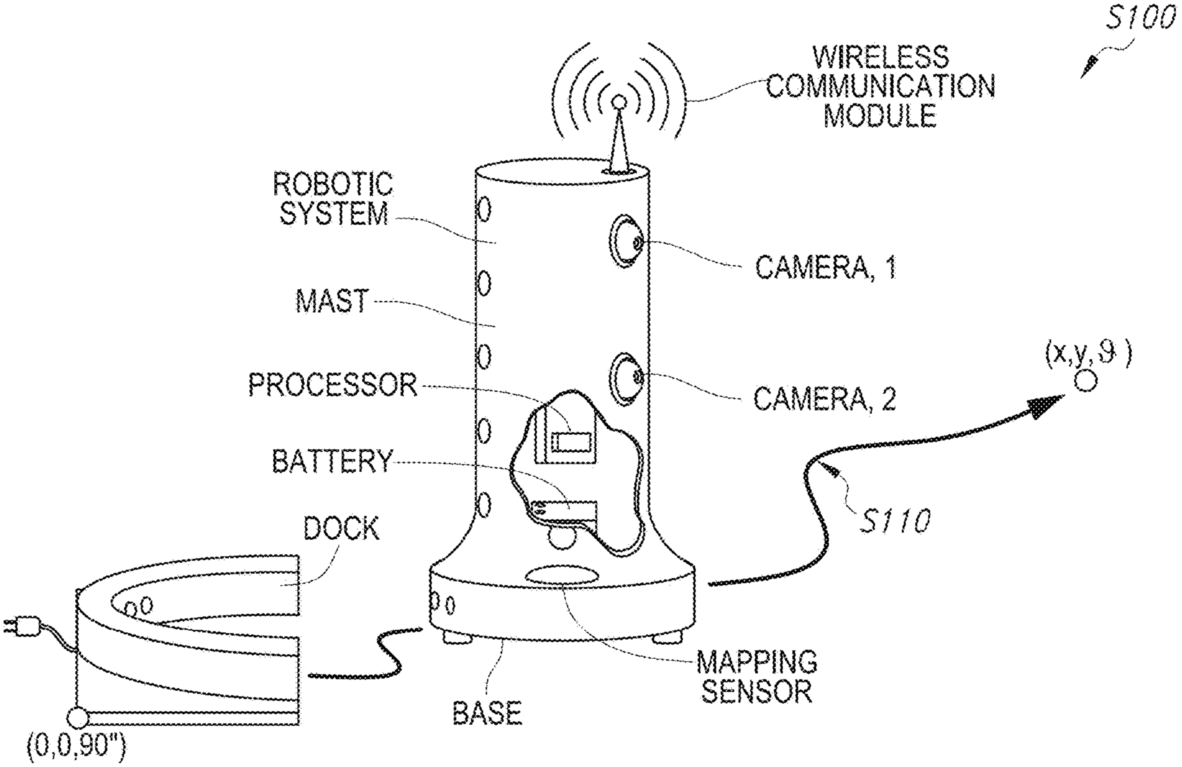
FIG. 3 is a schematic representation of a robotic system.

As shown in FIG. 3, a robotic system autonomously navigates throughout a store and records images-such as photographic images of packaged goods and/or depth images of inventory structures-continuously or at discrete predefined waypoints throughout the store during a scan cycle. Generally, the robotic system can define a network-enabled mobile robot configured to autonomously: traverse a store; capture photographic (e.g., color, black-and-white) and/or depth images of shelving structures, shelving segments, shelves, slots, or other inventory structures within the store; and upload those images to the computer system for analysis, as described below.

In one implementation shown in FIG. 3, the robotic system defines an autonomous imaging vehicle including: a base; a drive system (e.g., a pair of two driven wheels and two swiveling castors) arranged in the base; a power supply (e.g., an electric battery); a set of mapping sensors (e.g., fore and aft scanning LIDAR systems configured to generate depth images); a processor that transforms data collected by the mapping sensors into two- or three-dimensional maps of a space around the robotic system; a mast extending vertically from the base; a set of photographic cameras arranged on the mast; and a wireless communication module that downloads waypoints and a master map of a store from a computer system (e.g., a remote server) and that uploads photographic images captured by the photographic camera and maps generated by the processor to the computer system, as shown in FIG. 3. In this implementation, the robotic system can include photographic cameras mounted to the mast, such as a first vertical array of (e.g., two, six) photographic cameras on a left side of the mast and a second vertical array of photographic cameras on the right side of the mast, as shown in FIG. 3. The robotic system can additionally or alternatively include articulable photographic cameras, such as: one photographic camera mounted to a first vertical scanning actuator on the left side of the mast; and one photographic camera mounted to a second vertical scanning actuator on the right side of the mast. The robotic system can also include a zoom lens, a wide-angle lens, or any other type of lens on each photographic camera. However, the robotic system can define any other form, can include any other quantity or combination of color, depth, infrared, or other optical sensors, and can autonomously navigate through a store according to any other navigation and mapping techniques.

Furthermore, multiple robotic systems can be deployed in a single store and can be configured to cooperate to image shelves and product units within the store. For example, two robotic systems can be deployed to a large single-floor retail store and can cooperate to collect images of all shelves and inventory structures in the store within a threshold period of time (e.g., within one hour). In another example, one robotic system is deployed on each floor of a multi-floor store, and each robotic system collects images of shelves and inventory structures on its corresponding floor. The computer system can then aggregate photographic and/or depth images captured by these robotic systems deployed in this store to generate a graph, map, table, and/or task list for managing distribution and restocking of product throughout the store.

Furthermore, the computer system is described herein as accessing images captured by the robotic system during a scan cycle. However, the computer system can additionally or alternatively access such images captured by fixed camera modules throughout the store. Additionally or alternatively, Blocks of the method S100 can be executed locally by the robotic system (or by fixed camera modules) rather than remotely by the computer system (e.g., a remote server, a computer network).

4. Hierarchy and Terms

A "store" is referred to herein as a (static or mobile) facility containing one or more inventory structures.

A "product" is referred to herein as a type of loose or packaged good associated with a particular product identifier (e.g., a SKU) and representing a particular class, type, and varietal. A "unit" or "product unit" is referred to herein as an instance of a product—such as one bottle of detergent, one box of cereal, or package of bottle water—associated with one SKU value.

A "product facing" is referred to herein as a side of a product designated for a slot.

A "slot" is referred to herein as a section (or a "bin") of a shelf on an "inventory structure" designated for storing and displaying product units of the product type (i.e., of the same SKU or CPU). An inventory structure can include a shelving segment, a shelving structure, or other product display containing one or more slots on one or more shelves.

A "planogram" is referred to herein as a plan or layout designating display and stocking of multiple product facings across multiple slots, such as: in a particular shelving segment; across a particular shelving structure; across multiple shelving structures within a particular aisle; across multiple aisles in the store; or throughout the entirety of the store. In particular, the planogram can specify a target product type, a target product placement, a target product quantity, a target product quality (e.g., ripeness, time to peak ripeness, maximum bruising), and/or a target product orientation for a fully-stocked slot for each slot represented in the planogram. For example, the planogram can define a graphical representation of an inventory structure in the store, including graphical representations of each slot in this inventory structure, each populated with a quantity of graphical representations of product type assigned to this slot equal to a quantity of product facings assigned to this slot. Alternatively, the planogram can record textual product placement for one or more inventory structures in the store in the form of a spreadsheet, slot index, or other database.

Furthermore, a "realogram" is referred to herein as a representation of the actual products, actual product placement, actual product quantity, and actual product orientation of products and product units throughout the store during a scan cycle, such as derived by the computer system according to Blocks of the method S100 based on photographic images and/or other data recorded by the robotic system while autonomously executing scan cycles in the store.

The method S100 is described herein as executed by a computer system (e.g., a remote server, a computer network) remote from the robotic system. However, Blocks of the method S100 can be executed locally by one or more robotic systems deployed in a retail space (or store, warehouse, etc.), by a local computer system (e.g., a local server), or by any other computer system.

Furthermore, Blocks of the method S100 are described below as executed by the computer system to identify products, shelf tags, and promotional tags on open shelves in shelving structures within a grocery store. However, the computer system can implement similar methods and techniques to identify products, shelf tags, and promotional tags on cubbies, in a refrigeration unit, on a wall rack, on a freestanding floor rack, on a table, on a hot-food display, or on or in any other product organizer, display, or other inventory structure in a retail space.

5. Robotic System Deployment and Scan Cycle

Block S110 of the method S100 recites dispatching a robotic system to autonomously navigate throughout a store and to record images of inventory structures within the store during a scan cycle. Generally, in Block S110, the computer system can dispatch the robotic system to autonomously navigate along a preplanned sequence of waypoints or along a dynamic path and to record (e.g., photographic images and/or depth images) of inventory structures throughout the store.

5.1 Scan Cycle: Waypoints

In one implementation, the computer system: defines a set of waypoints specifying target locations within the store through which the robotic system navigates and captures images of inventory structures throughout the store during a scan cycle; and intermittently (e.g., twice per day) dispatches the robotic system to navigate through this sequence of waypoints and to record images of inventory structures nearby during a scan cycle. For example, the robotic system can be installed within a store, and the computer system can dispatch the robotic system to execute a scan cycle during store hours, including navigating to each waypoint throughout the store and collecting data representative of the stock state of the store in near real-time as patrons move, remove, and occasionally return product on, from, and to inventory structures within the store (e.g., shelving structures, refrigeration units, inventory structures, hanging racks, cubbies, etc.). During this scan cycle, the robotic system can: record photographic (e.g., color, black-and-white) images of each inventory structure; record depth images of all or select inventory structures; and upload these photographic and depth images to the computer system, such as in real-time or upon conclusion of the scan cycle. The computer system can then: detect types and quantities of packaged goods stocked in slots on these inventory structures in the store based on data extracted from these photographic and depth images; and aggregate these data into a realogram of the store.

The computer system can therefore maintain, update, and distribute a set of waypoints to the robotic system, wherein each waypoint defines a location within a store at which the robotic system is to capture one or more images from the integrated photographic and depth cameras. In one implementation, the computer system defines an origin of a two-dimensional Cartesian coordinate system for the store at a charging station—for the robotic system—placed in the store, and a waypoint for the store defines a location within the coordinate system, such as a lateral ("x") distance and a longitudinal ("y") distance from the origin. Thus, when executing a waypoint, the robotic system can navigate to (e.g., within three inches of) a (x,y) coordinate of the store as defined in the waypoint. For example, for a store that includes shelving structures with four-foot-wide shelving segments and six-foot-wide aisles, the computer system can define one waypoint laterally and longitudinally centered—in a corresponding aisle—between each opposite shelving segment pair. A waypoint can also define a target orientation, such as in the form of a target angle ("∂") relative to the origin of the store, based on an angular position of an aisle or shelving structure in the coordinate system. When executing a waypoint, the robotic system can orient to (e.g., within 1.5° of) the target orientation defined in the waypoint in order to align the suite of photographic and depth cameras to an adjacent shelving structure or inventory structure.

When navigating to a next waypoint, the robotic system can scan its environment with the same or other depth sensor (e.g., a LIDAR sensor, as described above), compile depth scans into a new map of the robotic system's environment, determine its location within the store by comparing the new map to a master map of the store defining the coordinate system of the store, and navigate to a position and orientation within the store at which the output of the depth sensor aligns—within a threshold distance and angle—with a region of the master map corresponding to the (x,y,∂) location and target orientation defined in this next waypoint.

In this implementation, before initiating a new scan cycle, the robotic system can download—from the computer system—a set of waypoints, a preferred order for the waypoints, and a master map of the store defining the coordinate system of the store. Once the robotic system leaves its dock at the beginning of a scan cycle, the robotic system can repeatedly sample its integrated depth sensors (e.g., a LIDAR sensor) and construct a new map of its environment based on data collected by the depth sensors. By comparing the new map to the master map, the robotic system can track its location within the store throughout the scan cycle. Furthermore, before navigating to a next scheduled waypoint, the robotic system can confirm completion of the current waypoint based on alignment between a region of the master map corresponding to the (x,y,∂) location and target orientation defined in the current waypoint and a current output of the depth sensors, as described above.

However, the robotic system can implement any other methods or techniques to navigate to a position and orientation in the store that falls within a threshold distance and angular offset from a location and target orientation defined by a waypoint.

5.2 Scan Cycle: Dynamic Path

In another implementation, during a scan cycle, the robotic system can autonomously generate a path throughout the store and execute this path in real-time based on: obstacles (e.g., patrons, spills, inventory structures) detected nearby; priority or weights previously assigned to inventory structures or particular slots within the store; and/or product sale data from a point-of-sale system connected to the store and known locations of products in the store, such as defined in a planogram; etc. For example, the computer system can dynamically generate its path throughout the store during a scan cycle to maximize a value of inventory structures or particular products imaged by the robotic system per unit time responsive to dynamic obstacles within the store (e.g., patrons, spills), such as described in U.S. patent application Ser. No. 15/347,689.

In this implementation, the robotic system can then continuously capture photographic images and/or depth images of inventory structures in the store (e.g., at a rate of 10 Hz, 24 Hz). However, in this implementation, the robotic system can capture images of inventory structures within the store at any other frequency during this scan cycle.

5.3 Scan Cycle Scheduling

In one implementation, the robotic system can continuously navigate and capture scan data of inventory structures within the store; when a state of charge of a battery in the robotic system drops below a threshold state, the robotic system can return to a charging station to recharge before resuming autonomous navigation and data capture throughout the store.

Alternatively, the computer system can schedule the robotic system to execute intermittent scan cycles in the store, such as: twice per day during peak store hours (e.g., 11 AM and 6 PM on weekdays) in order to enable rapid detection of stock condition changes as patrons remove, return, and/or move products throughout the store; and/or every night during close or slow hours (e.g., 1 AM) to enable detection of stock conditions and systematic restocking of understocked slots in the store before the store opens the following morning or before a next peak period in the store.

In one implementation, the computer system can schedule the robotic system to execute scan cycles for particular product types that sell quickly and should be stocked adequately at all possible times (e.g., at predefined regular intervals, more frequent intervals than other products, or dynamic intervals based on historical patterns of stock levels of a product type over a given time period).

However, the computer system can dispatch the robotic system to execute scan cycles according to any other fixed or dynamic schedule.

6. Image Access

Block S120 of the method S100 recites accessing an image of an inventory structure captured by the robotic system during the scan cycle. Generally, the robotic system can return images (e.g., photographic and/or depth images) recorded during the scan cycle to a remote database, such as in real-time during the scan cycle, upon completion of the scan cycle, or during scheduled upload periods within the scan cycle. The computer system can then access these images from this database in Block S120 before processing these images according to Blocks of the method S100 described below.

In one implementation, the computer system processes individual photographic images according to the method S100 in order to identify product units depicted in these individual images. Alternatively, the computer system can: stitch multiple photographic images into one composite photographic image representing a greater length of one inventory structure (or greater length of multiple adjacent inventory structures); and then process this "composite" photographic image according to methods and techniques described below. In this variation, the computer system can similarly: stitch multiple depth images into one composite depth image representing this greater length of this inventory structure; and then process this "composite" depth image according to methods and techniques described below.

7. Image Segmentation and Shelf Detection

Block S130 of the method S100 recites detecting a set of shelf faces, in the inventory structure, depicted in the photographic image. Generally, in Block S130, the computer system can extract features from the photographic image and detect discrete shelf faces (or shelves, more generally) in the photographic image based on these features.

In one implementation, the computer system: detects a set of features in the photographic image; extracts—from this set of features—a first linear feature nearest a bottom of the image and extending laterally across (substantially a full width of) the photographic image; extracts—from this set of features—a second linear feature extending laterally across (substantially the full width of) the photographic image and offset above the first linear feature by a distance approximating a common or known shelf face height of inventory structures throughout the store; and defines a first shelf face region between the first linear feature and the second linear feature in the image. In this implementation, the computer system can similarly: extract—from this set of features—a third linear feature extending laterally across the photographic image and offset above the second linear feature (e.g., by a height greater than a package height of a tallest product assigned to the first shelf in this inventory structure by the planogram of the store); extract—from this set of features—a fourth linear feature extending laterally across the photographic image and offset above the third linear feature by a distance approximating the common or known shelf face height; and define a second shelf face region between the third linear feature and the fourth linear feature in the image. The computer system can repeat this process to define shelf face regions around other shelf faces depicted in this image.

In the foregoing example, the computer system can also define a first product region extending from proximal the second linear feature to proximal the third linear feature above and extending across the full width of the photographic image. In particular, the computer system can thus define a first product region—depicting product units occupying this first shelf in the inventory structure—in this image. The computer system can repeat this process for each other shelf in the inventory to define a set of product regions from this image, each depicting product units occupying one shelf in the inventory structure.

The computer system can then: retrieve or generate a realogram for this inventory structure; and populate this realogram with representations of shelf faces and adjacent product regions thus detected in the image of this inventory structure.

However, the computer system can implement any other method or technique to segment this image of the inventory structure into regions depicting shelf faces and regions depicting products occupying volumes between shelf faces in this inventory structure.

8. Shelf Tag Detection

Blocks S140, S142, and S144 of the method S100 recite: detecting a shelf tag on a first shelf face, in the set of shelf faces, in the image; delineating a first slot above the first shelf face based on a position of the shelf tag in the image; and retrieving a promotion status of the first slot based on data extracted from the first shelf tag in Block S144. Generally, in Blocks S140, S142, and S144, the computer system can scan a shelf face region in the image for a shelf tag, extract product information from this shelf tag, and retrieve promotion details for a corresponding slot on the shelf based on these product information.

In one implementation, the computer system scans laterally across a first shelf face region—extracted from the image—for a barcode. Upon detecting a barcode in this first shelf face region, the computer system can: decode the barcode for a product identifier; query a product database for product information (e.g., a SKU value, a product description, and current product pricing) linked to this product identifier; read a slot address directly from the first shelf tag containing this barcode or by querying the planogram for a slot address linked to this barcode; and read a price value from the first shelf face region.

In one implementation, the computer system can detect the first slot in the inventory structure by locating the first slot in the inventory structure based on a position of the first shelf tag detected in the image. The computer system can: identify a first product type assigned to the first slot by detecting a first shelf tag on the inventory structure in the image; extract a set of features from the first shelf tag detected in the image (such as including, e.g., a barcode); identify a first product identifier (e.g., a SKU value) of the first product type advertised by the first shelf tag based on the set of features; and identify the first product type based on the product identifier (e.g., by querying a product database).

8.1 Promotion Specification

The computer system can also query the planogram or a promotion schedule for the store for a current promotion for the product type and/or product identifier assigned to a first slot. For example, the planogram or promotion schedule can specify a promotion status, consisting of a promotion format and corresponding promotional parameters for the first slot, such as: "2 for $5"; "buy one, get one free"; or "buy [SKU X], get [SKU Y] for [Z] % off." The planogram or promotion schedule can also specify promotional restrictions for the first slot, such as: "for club members only"; or "applicable to purchases over $ [X]." The planogram or promotion schedule can further specify a promotion duration for the first slot, such as: fixed start and end dates; or rules for a dynamic promotion duration. For example, the planogram or promotion schedule can specify a dynamic duration for the first slot based on inventory of a first product assigned to this slot, such as concluding the promotion when a quantity of units of the product in inventory at the store drops below a threshold quantity (e.g., 20 units). In this example, the computer system can also: access a current stock state of the store derived from product presence and/or product quantity extracted from images captured by the robotic system during a last scan cycle, as described below, and/or access product sales data from point-of-sale system deployed in the store to estimate a quantity of units of the product present or inventoried in the store; and then extend or terminate the promotion for the first slot based on the dynamic promotion duration rules assigned to the first slot.

The computer system can repeat this process to detect additional barcodes in the shelf face region of the image and to retrieve product and promotion details for corresponding slots on this first shelf of the inventory structure based on these barcodes.

In one implementation, the computer system can generate the promotion schedule based on a website associated with the store and the promotions advertised on the website. Accordingly, the computer system can reference a promotion schedule that contains current promotion data that matches expectations from customers who may browse the store website for ongoing deals for particular products. More specifically, the computer system can: scan a digital product catalog associated with the store that includes a population of product types stocked in the store and corresponding promotion statuses for the population of product types; and compile the corresponding promotion statuses into the promotion schedule.

8.2 Slot Delineation

The computer system can then delineate slots in the first product region-above the first shelf face region—in this image. For example, the computer system can define a first slot boundary: extending vertically from a top edge of the first shelf face region to a bottom edge of the second shelf face region—above the first shelf face—in the image; defining a left edge extending vertically upward from proximal an upper-left corner of the first shelf tag detected in the first shelf face region in the image; and defining a right edge extending vertically upward from proximal an upper-left corner of a second shelf tag-adjacent and to the right of the first shelf tag-detected in the first shelf face region in the image. The computer system can then link product and promotion details associated with the first shelf tag (e.g., retrieved based on the first barcode detected on the first shelf tag or extracted directly from the first shelf tag) to this first slot boundary. The computer system can additionally or alternatively transfer this first slot boundary and corresponding product and promotion details onto the realogram of this inventory structure, thereby recording a true location, current product data, and a target promotion status of this first slot in the inventory structure.

The system can then repeat this process for each other shelf tag and shelf tag region detected in the image.

However, the computer system can implement any other method or technique to detect a shelf tag, to retrieve product and promotion details linked to this shelf tag, to define a slot associated with this shelf tag, and to link this shelf tag and corresponding product and promotion details to this slot in Blocks S140, S142, and S144.

9. Stock State

The computer system can also implement methods and techniques described in U.S. patent application Ser. No. 15/600,527 to: scan within and around each slot region thus defined in the image for features representative of product units; identify product units occupying these slots on the inventory structure based on features extracted from within and around this slot regions in the image depicting; and aggregate types and quantities of these product units identified in these slot regions into a stock condition of the inventory structure. For example, the computer system can represent types and quantities of product units detected in each slot in this inventory structure in graphical representations of these slots in the realogram of this inventory structure.

In one implementation described above, the computer system can define a set of slots along the lateral span of this first shelf detected in the image, wherein each slot in this set: defines a bottom-left corner proximal one shelf tag or barcode detected on the shelf; extends rightward up above a left edge of an adjacent slot proximal a next shelf tag or barcode detected on the shelf; and extends upward to the bottom of the adjacent shelf in this inventory structure. Then, for a first slot on the first shelf, the computer system can: decode a first shelf tag or barcode-depicted on the face of the shelf adjacent the bottom-left corner of the first slot-into a product identifier (e.g., a SKU value, a UPC value) of a first product assigned to the first slot; and implement optical character recognition techniques to read a target quantity of facings—for this product in this slot—from the shelf tag. The computer system can also retrieve a representation of the first product based on this product identifier-such as in the form of a set of template images, a color model (e.g., a histogram of colors present on packaging of the product), and/or a symbol model (e.g., text, icons, or symbols present on packaging of the product), etc. representative of the first product—from a product database. Additionally or alternatively, the computer system can: query the planogram for an identifier of a product assigned to this first slot and then retrieve a representation of this first product from the first product database; and/or query the planogram for a target quantity of facings of the first product assigned to this slot.

The computer system can then implement object detection techniques to detect and identify discrete objects in the first slot region of the image depicting this first slot. For example, for each discrete object detected in the slot, the computer system can: extract a set of features within a boundary of the object; and compare these features to the representation of the first product assigned to this first slot to either identify the object as a unit of the first product assigned to this first slot or identify the object as incorrectly stocked in the first slot. The computer system can then calculate an actual quantity of product facings of the first product present in the first slot based on a quantity of discrete objects containing features matched to the representation of the first product.

In a similar implementation, the computer system can determine a stock state of product quantity on the inventory structures and alert a store associate to restock a particular product type if the product quantity is low and/or drops below a threshold target quantity, particularly if a shelf tag for the product type indicates that the product type sells quickly and should be stocked adequately at all possible times (e.g., a "never out" product indicator). The computer system can prioritize detecting the stock levels of these product types and dispatch the robotic system accordingly to verify adequate stock levels of these product types at regular or more frequent intervals than other product types. More specifically, the computer system can: extract a first set of features from a first shelf tag detected in an image of an inventory structure; identify a first slot in the inventory structure corresponding to the first shelf tag; identify a product type specified by the first shelf tag based on the first set of features; interpret a target quantity of units of the product type assigned to the first slot based on the first set of features; extract a second set of features from a region of the image depicting the first slot; identify a quantity of product units of the product type occupying the first slot based on the second set of features; in response to the quantity of product units differing from the target quantity by more than a threshold difference, generate a prompt to restock the first slot with product units of the product type; and transmit the prompt to the computing device associated with the store associate. Thus, the computer system ensures that appropriate stock levels of particular product types (e.g., "never out" products indicated by a shelf tag) are maintained at a sufficient level and frequency by reliably detecting stock levels of these product types and informing a store associate and/or team in a reasonable timeframe (e.g., within 10 minutes of detecting low stock levels) that restocking of a product type is needed, thereby reducing potential customer frustration that a favorite product is not stocked in the store often enough.

The computer system can also calculate an actual quantity of misplaced product units present in the first slot based on a quantity of discrete objects containing features distinct from (i.e., not matched to) the representation of the first product. Furthermore, the computer system can implement methods and techniques described above and in U.S. patent application Ser. No. 15/600,527 to compare features of these misplaced product units to representations of other products assigned to nearby slots in the inventory structure in order to identify these misplaced product units.

The computer system can then update the realogram of the inventory structure to reflect: the actual quantity of product facings of the assigned product; and the quantity of misplaced product units occupying the slot (i.e., the "stock condition" of the slot). (The computer system can similarly update a cell in a spreadsheet corresponding to the first slot with this derived stock condition and/or annotate the region of the image depicting this first slot with this derived stock condition.)

The computer system can repeat this process for each other slot detected on this shelf and can update the realogram (or the spreadsheet, the image) to reflect the current stock condition of the shelf accordingly. The computer system can also repeat this process for each other shelf detected on the inventory structure in order to update the realogram (or the spreadsheet, the image) to reflect the current stock condition of the inventory structure as a whole.

Therefore, the computer system can: extract product identifier and product facing information for a slot from a shelf tag in the image of the inventory structure and/or retrieve this information from a planogram of the inventory structure; and determine identities and quantities of product units occupying this slot based on these data. The computer system can then record these identification and quantity data for slots on these shelves in a realogram, spreadsheet, or other data structure for the inventory structure.

10. Promotional Tag Detection and Promotion Data Extraction

Block S150 of the method S100 recites scanning a first region of the image proximal the first shelf tag for a promotional tag. Generally, in Block S150, the computer system can scan along and below a shelf face region in the image for promotional tags for slots depicted in the slot region above. The computer system can: detect promotional tags (e.g., temporary paper or cardstock "hang tags" adhered on vertical shelf faces, potentially near corresponding shelf tags) in the image that inform customers of promotions associated with product types within the store; extract sets of features from promotional tags (e.g., by implementing optical character recognition techniques), such as features including a product identifier, bar code, SKU, product description, price, nutritional values (e.g., "gluten free," "vegan," "wheat free," "dairy free," "organic," "non-GMO," "soy free," "no added sugar," and other relevant nutritional information), promotion status (specifying a promotion format and/or corresponding promotion parameters, such as a duration, date, range of dates in which the promotion is valid, or a "members only" indication), geometry features of the promotional tag (e.g., a rectangular or round shape, whether a portion of the shelf tag is torn or bent), and other relevant information on the promotional tag; and interpret promotion data advertised by the promotional tags (based on the type of promotion and/or corresponding promotion parameters).

In one example, the computer system can interpret promotion data including the promotion format, such as including "[X] % off," "buy [Y] quantity, get [Z] quantity free," "get [A] quantity for [B] dollars," "applicable to purchases over [X] dollars," buy [SKU X], get [SKU Y] for [Z] % off," or some combination thereof. Additionally or alternatively, the computer system can interpret promotion data including the promotion parameters, such as including a "club members only" promotion and/or price, a specified duration (e.g., "for the next [X] days," "valid until [MONTH/DAY]"), a specified date (e.g., "valid on [MONTH/DAY] only, "[DAY] special"), and/or a specified range of dates (e.g., "valid from [MONTH/DAY] to [MONTH/DAY]"). By interpreting promotion data advertised by the promotional tags, the computer system can then verify the validity and accuracy of the promotion status of promotional tags relative to corresponding shelf tags, a planogram, a promotion schedule, or some combination thereof.

In one implementation, the computer system can identify a barcode present on a promotional tag, detect a corresponding shelf tag near the promotional tag based on a matching between the barcode present on the promotional tag and a barcode present on the corresponding shelf tag, and then verify the validity and accuracy of the information advertised by the promotional tags based on the information presented on the corresponding shelf tag.

In another implementation, the computer system can detect a missing barcode on the promotional tag, implement alternate methods (e.g., heuristics, optical character recognition (OCR), and natural language processing techniques)

to extract information from the promotional tag (e.g., a product identifier, SKU, product description, price, and/or other relevant information), and then detect a corresponding shelf tag near the promotional tag based on a matching between the extracted information on the promotional tag and information present on the corresponding shelf tag (that can be extracted from the shelf tag using similar methods described herein and/or by identifying a barcode on the shelf tag and querying a planogram and/or realogram to interpret product information associated with the shelf tag).

In a similar implementation, the computer system can detect that a promotional tag in an image corresponds to a family of products rather than only a single product type (e.g., a promotional tag advertises a current promotion status for all flavors of Nabisco® Wheat Thins® and thus one promotional tag is present on the inventory structure in the image and corresponds to multiple, related product types; further, the promotional tag may be missing a barcode as it corresponds to more than one product type). In this example, the computer system can then implement object detection techniques to detect and identify discrete objects in the slot regions of the image corresponding to the promotional tag. For example, for each discrete object detected in the slots, the computer system can: extract a set of features within a boundary of the object; and compare these features to a representation of a product assigned to one of the slots to either identify the object as a unit of the product assigned to the slot or identify the object as incorrectly stocked in the slot.

The computer system can also calculate an actual quantity of misplaced product units present in the slots based on a quantity of discrete objects containing features distinct from (i.e., not matched to) the representation of the product. Furthermore, the computer system can implement methods and techniques described above and in U.S. patent application Ser. No. 15/600,527 to compare features of these misplaced product units to representations of other products assigned to nearby slots in the inventory structure in order to identify these misplaced product units. Accordingly, the computer system can verify that the product units present in the slots corresponding to the promotional tag are valid and correctly placed based on the family of product types associated with the promotional tag.

10.1 Promotional Tag Region

In one implementation, the computer system defines a promotional tag region extending along the full width of the shelf (or shelving segment, or shelving structure) depicted in the image; and extending over the shelf face and downward below the bottom edge of the shelf face, such as by a distance corresponding to a maximum promotional tag length. The computer system then scans laterally across this promotional tag region for features representative of a promotional tag, such as: colors in a promotional tag color palette for the store (e.g., yellow background with a red perimeter and black text); a promotional tag shape (e.g., a rectangular object of width approximating a known width of promotional tags deployed in the store); and/or a promotional tag barcode or QR code. Upon detecting a contiguous group of features representative of a promotional tag, the computer system can define a boundary around these features—such as based on a known shape or geometry of promotional tags deployed in the store (e.g., rectangular geometry of fixed width but unknown height)—extending below the first shelf face depicted in this image. The computer system can then implement computer vision techniques to extract promotion details from within this bounded subregion of the image, such as: a decoded barcode or QR code value; a product description; a promotion description (e.g., "2 for $5," buy one, get one free"); promotion limitations (e.g., "for club members only," "applicable to purchases over $50"); and/or a promotion duration (e.g., "expires on 31 Dec. 2019").

The computer system can then link these extracted promotion details—extracted from this subregion of the image depicting a first promotional tag—with a location on the inventory structure, such as linked to an (x,y) location of the centroid of the subregion in the image depicting this first promotional tag. Additionally or alternatively, the computer system can associate these extracted promotion details—and the first promotional tag more generally—with a particular shelf tag and/or with a particular slot on the inventory structure. In particular, the computer system can associate this first promotional tag with a nearest shelf tag or slot that fulfills promotional tag rules stored for the store. The computer system can retrieve a promotional tag rule from a set of promotional tag rules (e.g., that can be defined by the store) and characterize relative positions of promotional tags and shelf tags to determine if the characterized distances fulfill the promotional tag rule.

For example, based on a first promotional tag rule, the computer system can link the first promotional tag to a first shelf tag and/or a first slot if this first promotional tag falls below and/or to the right or left of the first shelf tag with a minimum portion of the width (e.g., 80%) of the promotional tag falling within the width of the first slot.

In another example, based on a second promotional tag rule, the computer system can link the first promotional tag to a first shelf tag and/or a first slot if the first promotional tag is positioned within a threshold distance from the first shelf tag, wherein the threshold distance is defined by the store (e.g., a store policy could instruct store associates to position promotional tags at a distance of 1 inch or less from its corresponding shelf tag on an inventory structure).

In another example, based on a third promotional tag rule, the computer system can link the first promotional tag to a first shelf tag and/or a first slot if the promotional tag is positioned above or below the first shelf tag and has a form factor larger than that of the first shelf tag by a defined minimum threshold, for example, if a promotional tag is enlarged and displayed prominently to attract the attention of customers (e.g., the promotional tag is positioned above a shelf tag and/or slot and is at least 1.5× or 2× larger than the shelf tag). In another example, the computer system can link the first promotional tag to a first shelf tag and/or a first slot based on some combination of promotional tag rules described herein.

More specifically, the computer system can: retrieve a promotional tag rule for the store, the promotional tag rule specifying an arrangement of promotional tags relative to corresponding shelf tags and threshold distances between promotional tags and corresponding shelf tags; detect a shelf face in the image; detect the first shelf tag on the inventory structure by detecting a row of shelf tags on the shelf face; detect the first promotional tag on the inventory structure by detecting a row of promotional tags on the shelf face; and associate the first promotional tag with the first shelf tag by characterizing a first distance between and a first relative position of the first promotional tag, in the row of promotional tags, and the first shelf tag, in the row of shelf tags, and linking the first promotional tag to the first shelf tag in response to the first distance and the first relative position fulfilling the promotional tag rule.

The computer system can repeat this process for each other promotional tag detected in the promotional tag region of this image.

10.2 Slot- and Shelf Tag-based Promotional Tag Detection

In another implementation, after defining a first slot relative to a first shelf tag detected in the first shelf face region in the image, as described above, the computer system defines a first promotional tag region: extending along the full width of the first slot in the image; extending over the shelf face; and extending downward below the bottom edge of the shelf face, such as by a distance approximating a maximum length of promotional tags deployed in the store. The computer system then scans this first promotional tag region for features representative of a promotional tag, such as described above. Then, if the computer system fails to detect a promotional tag in this first promotional tag region, the computer system can mark the first slot—and the corresponding first shelf tag—as excluding a promotional tag. Conversely, if the computer system succeeds in detecting a promotional tag in this first promotional tag region, the computer system can: mark the first slot—and the corresponding first shelf tag—as including a promotional tag; extract promotion details from this promotional tag, such as described above; and link these extracted promotion data to this first slot and first shelf tag accordingly. The computer system can then repeat this process for each other slot delineated in the inventory structure depicted in the image.

However, the computer system can implement any other method or technique to detect a promotional tag in the image, to extract promotion details from a region of this image depicting this promotional tag, and to link these promotion details to the corresponding slot and/or shelf tag. The computer system can then update the realogram of this inventory structure to reflect the presence, position, published promotion details (i.e., promotion details presented on a promotional tag), and slot and shelf tag association data for each promotional tag thus detected in the image.

10.3 Unreadable Promotional Tag Detection

However, because a promotional tag hangs below a shelf face and may not be rigid, the position of the promotional tag may change over time and may be unpredictable such that the promotion details depicted on this promotional tag may be unreadable or obscured in the image.

For example, a patron may remove a unit of a product from a slot below a promotional tag and then return this product unit back to this slot. However, in the process of returning this product unit to this second slot, the top of this product unit may catch the promotional tag, may drag the free end of the promotional tag toward the back of the inventory structure, and thus trap the free end of the promotional tag between the top of this product unit and the bottom of the shelf on which the promotional tag is currently attached, thereby obscuring promotion details depicted on the promotional tag from both patrons and from cameras on the robotic system.

In another example, while shopping a patron may remove a unit of a product from a slot below the promotional tag. However, in the process of removing this product unit from this lower slot, the top of this product unit may catch the promotional tag and may drag the free end of the promotional tag outward from the inventory structure such that the free end of the promotional tag juts into the aisle and such that a face of the promotional tag falls nearly parallel to (e.g., within 15° of) a focal axis of a camera in the robotic system when the robotic system is facing this inventory structure during a subsequent scan cycle. Because the face of the promotional tag falls near the focal axis of this camera, an image of this promotional tag-captured by this camera in the robotic system—may depict promotion details on this promotional tag with severe keystoning such that these promotion details are not readable (or are not readable with sufficient confidence) by the computer system.

In a similar example, while shopping a patron may remove a unit of a product from a slot below the promotional tag. However, in the process of removing this product unit from this lower slot, the top of this product unit may catch the promotional tag and may drag the free end of the promotional tag outward from the inventory structure such that the free end of the promotional tag juts into the aisle and such that a face of the promotional tag is angularly offset from the shelf face. Because cameras in the robotic system may be oriented to capture vertical faces of product units—occupying inventory structures in the store—with limited glare from overhead lighting systems, this reorientation of the promotional tag may lead to glare across the face of the promotional tag in an image of the inventory structure captured by the robotic system such that promotion details on the promotional tag are not readable by the computer system.

Additionally or alternatively, because a promotional tag is temporary, this promotional tag may be constructed from paper or light cardstock and therefore may be more susceptible to (unintentional and intentional) damage, such as by shopping carts dragged along a shelf face. Thus, if the promotional tag is torn, wrinkled, or otherwise damaged, the robotic system may be unable to read promotion details (with sufficient confidence) from an image of this damaged promotional tag.

However, in the foregoing examples, the computer system may still detect a base of the promotional tag attached to a shelf face. For example, the computer system can detect features representative of the promotional tag in a shelf tag region of an image of an inventory structure and then confirm presence of a promotional tag for the corresponding slot and shelf tag accordingly. The computer system can also: extract a relative position of the promotional tag—such as relative to the corresponding shelf tag—from the image; and store presence, position, and shelf tag association data for this promotional tag in the realogram of the inventory structure.

Therefore, the computer system can update the realogram of this inventory structure to reflect at least the presence, position, and slot and shelf tag association data for each promotional tag thus detected in the image, even for damaged and obscured promotional tags on this inventory structure.

Additionally or alternatively, the computer system can: capture a set of images of the inventory structure from varying angles to detect and read the promotional tag; and synthesize data extracted from the set of the captured images, thereby interpreting the information advertised by the promotional tag.

10.4 Promotional Tag Template Matching

In one implementation, the computer system can implement machine learning to identify features of a promotional tag and determine a match between the promotional tag and a promotional tag template of a set of promotional tag templates. The computer system can match the promotional tag to a promotional tag template based on a distribution of the features extracted from the promotional tag and the corresponding types of the features. For example, the computer system can: retrieve a promotional tag template from the set of promotional tag templates—each promotional tag template specifying an orientation of a promotional tag, a shape and/or geometry of the promotional tag, a barcode in a first region of the promotional tag, a promotion format in a second region, a date or duration in a third region, a product identifier and/or SKU in a fourth region, other relevant information on the promotional tag and a corresponding location, or some combination thereof; calculate a similarity score between features and respective feature locations of the promotional tag and target features and respective target feature locations of the promotional tag template; and verify correspondence between the features and the respective feature locations in response to the similarity score exceeding a threshold.

In one example, the computer system can: determine a match between the features of a promotional tag and the features of a promotional tag template by retrieving a target location for a promotion status from the promotional tag template; and identify a promotion status feature (e.g., a promotion format and/or a date and/or duration) in the corresponding target location on the promotional tag. By identifying a correspondence between a feature in a location on the promotional tag to a target feature in a target location on the promotional tag template, the computer system can verify that the features of the promotional tag align with the particular promotional tag template.

In a similar example, the computer system can determine a match between the features of a promotional tag and the features of a promotional tag template within a defined threshold (e.g., as a percentage or a probability, such as at least a 70% correlation between features of the promotional tag and the promotional tag template). The computer system can determine the match based on the defined threshold, which can be specified for a particular store based on how strictly the particular store follows a set of templates or rules when generating and printing promotional tags and/or how much variation there is in promotional tags generated by the particular store.

In another example, the computer system can confirm an accuracy of promotion details by comparing the promotion format advertised on a promotional tag to a target promotion format indicated by a current promotion status of the product type listed in the promotion schedule. More specifically, the computer system can: retrieve a current promotion status (e.g., from the promotion schedule) assigned to a first product type of the first slot on the inventory structure by retrieving a target promotion format assigned to the first product type; and interpret a first promotion status advertised by the first promotional tag by interpreting a first promotion format advertised by the first promotional tag. In some example implementations, the computer system can detect a conflict between the first promotion status and the current promotion status by detecting a difference between the first promotion format and the target promotion format.

In one particular example, the computer system can: retrieve the target promotion format assigned to the first product type by retrieving the target promotion format such as "buy [X] quantity, get [Y] quantity free" from the promotion schedule; and interpret the first promotion format advertised by the first promotional tag by interpreting the first promotion format such as "[X] % discount" from the first set of features.

In one implementation, the computer system can: extract a set of features from the first promotional tag by extracting a distribution of feature types from a first region of the image depicting the first promotional tag; access a set of promotional tag templates; match the first promotional tag to a first promotional tag template, in the set of promotional tag templates, based on the distribution of feature types; retrieve a target promotion status location and a promotion status interpreter for the first promotional tag template; identify a target feature, in the set of features, located in the target promotion status location on the first promotional tag; and interpret a first promotion status advertised by the first promotional tag based on the target feature and the promotion status interpreter. In one example, the computer system can: detect that the first promotion status advertised by the first promotional tag exceeds a price advertised by a corresponding shelf tag (i.e., the "gut check" analysis described herein); and, in response to the first promotion status advertised by the first promotional tag exceeding a price advertised by the corresponding shelf tag, detect a deviation between the first shelf tag and the first promotional tag.

To accurately match promotional tags to promotional tag templates, the computer system can train machine learning models based on an orientation of the promotional tag, geometry of the promotional tag, lighting of the inventory structure in a captured image, a print quality of the promotional tag, color spacing and distribution of the features on the promotional tag, and other relevant factors, thus ensuring that the computer system implements the machine learning model with a high level of accuracy in determining matches.

Additionally or alternatively, the computer system can implement heuristics, optical character recognition, and natural language processing techniques (e.g., in the event that a machine learning model does not match a promotional tag to a promotional tag template).

11. Slot/Promotional Tag Correspondence

The computer system can then verify that presence of a promotional tag—and published promotion details read from this promotional tag—corresponds to a promotion status of the corresponding slot.

In one implementation, the computer system can verify the presence of a promotional tag at multiple corresponding slots (e.g., if a product type with a current promotion status is located in more than slot and/or inventory structure within the store, such as shelving structures in a primary aisle, shelving structures that cap an end of an aisle, one or more stand-alone shelving structures that increase customer visibility and draw attention to a particular promotion for a product, or some combination thereof) to ensure that the promotion status of a product type is consistently and uniformly advertised throughout the store at locations of the product type.

11.1 Promotional Tag Presence

In one implementation, for the first slot depicted in the image, if the computer system detects absence of a promotional tag in a position on the first shelf face corresponding to the first slot on the inventory structure but the planogram or promotion schedule for the store indicates that a promotion is currently active for the first slot, the computer system can retrieve a time to conclusion of this promotion for the first slot. Then, if the time to conclusion of this promotion is less than a threshold duration (e.g., 8 hours), the computer system can mark the first slot as (sufficiently) accurate, such as by annotating a representation of the first slot in the realogram of the inventory structure with a visual icon (e.g., a yellow checkmark icon) to indicate accuracy of the promotional state of the first slot within a temporal bound; and/or by updating a promotion spreadsheet for the store to reflect pending accuracy of the promotion status of the first slot.

However, if the time to conclusion of this promotion is more than the threshold duration, the computer system can store a promotion status error for the first slot, such as: by annotating the representation of the first slot in the realogram of the inventory structure with a visual icon (e.g., a red error icon) to indicate absence of a promotional tag from the first slot; and/or by updating the promotion spreadsheet to reflect improper absence of a promotional tag for this first slot. The computer system can also prompt or schedule a store associate to generate (e.g., print) a promotional tag for this promotion and to apply this promotional tag on the shelf face below this first slot. In one variation, the computer system can also generate a print file for a new promotional tag—containing promotion details assigned to this slot by the planogram and/or promotion schedule—and queue a printer at the store to print this print file on behalf of the store associate.

Conversely, if the computer system detects a promotional tag in a position on the first shelf face corresponding to the first slot but the planogram or promotion schedule indicates that a promotion is not currently active for the first slot, the computer system can instead store a promotion status error for the first slot, such as: by annotating the representation of the first slot in the realogram of the inventory structure with a visual icon (e.g., a red error icon) to indicate incorrect presence of a promotional tag at the first slot; and/or by updating the promotion spreadsheet to reflect improper presence of a promotional tag at this first slot. The computer system can also prompt or schedule this promotional tag for immediate removal by a store associate.

11.2 Promotion Details Verification

However, if the computer system detects a promotional tag in a position on the first shelf face corresponding to the first slot and if a promotion is currently active for this slot, the computer system can verify alignment between published promotion details read from the promotional tag and the promotion status of the slot specified in the planogram or promotion schedule. More specifically, the computer system can verify that a promotion format and promotion parameters published on the promotional tag and extracted from the image of the inventory structure fully match the promotion format and promotion parameters assigned to this slot and/or product type by the planogram or promotion schedule.

For example, the computer system can directly compare each value read from the first promotional tag to the corresponding value in the promotion status of the first slot thus defined in the planogram or the promotion schedule. Then, upon confirming alignment of each of these values for the first slot, the computer system can: confirm accuracy of the first promotional tag; annotate the representation of the first slot in the realogram with a visual icon (e.g., an encircled green checkmark icon) to indicate presence and accuracy of the first promotional tag at this first slot; and/or update the promotion spreadsheet to reflect accuracy of the first promotional tag at this first slot.

In one implementation, the computer system can first perform a "gut check" analysis of the price advertised by the first promotional tag to ensure that the price advertised represents a better value than the price advertised by the corresponding shelf tag before the computer system compares the remaining values of the first promotional tag to the first shelf tag and verifies the accuracy of the remaining values of the first promotional tag. By first performing a "gut check" analysis of the price advertised by the first promotional tag, the computer system can quickly and efficiently identify an erroneous promotional tag without analyzing the remaining published promotion data of the first promotional tag. In particular, the computer system can: interpret a first price for the product type advertised by the first promotional tag based on the first set of features extracted from the first promotional tag; identify a second price for the product type advertised by the first shelf tag based on the second set of features extracted from the first shelf tag; and, in response to the second price advertised by the first shelf tag exceeding the first price advertised by the first promotional tag, verify price consistency of the first promotional tag. In one example, in response to verifying price consistency of the first promotional tag, the computer system may then detect a conflict between the first promotion status advertised by the first promotional tag and the current promotion status defined by the planogram or promotion schedule by scanning the first promotion status advertised by the first promotional tag for deviation from the current promotion status assigned to the first product type.

In a similar implementation, the computer system can perform a "gut check" of the promotion date(s) advertised by the first promotional tag. If the computer system detects that the advertised dates have passed and/or expired, the computer system can identify the promotional tag as erroneous without analyzing the remaining published promotion data of the first promotional tag.

Upon detecting misalignment between at least one of these values on the first promotional tag and a corresponding value in the promotion status of the first slot, the computer system can: confirm inaccuracy of the first promotional tag; annotate the representation of the first slot in the realogram with a visual icon (e.g., an encircled red "X" icon) to indicate inaccuracy of the first promotional tag present at this first slot; and/or update the promotion spreadsheet to reflect inaccuracy of the first promotional tag at this first slot. The computer system can then prompt or schedule a store associate to remove the first promotional tag and to replace the first promotional tag with a corrected promotional tag with promotion details that match the current promotion status assigned to this first slot by the planogram or promotion schedule. As described above, the computer system can also generate a print file for a new promotional tag—containing promotion details assigned to this slot by the planogram—and queue a printer at the store to print this print file on behalf of the store associate). More specifically, the computer system can: generate a print file for a replacement promotional tag based on the first promotion status and correcting the conflict; and queue a printer to print the replacement promotional tag.

In one implementation, the computer system can detect a conflict between a shelf tag and a promotional tag based on information about the product type stored in the product database. More specifically, the computer system can: identify a first product identifier of a first product type advertised by the first shelf tag based on a first set of features extracted from a first shelf tag; retrieve a first attribute of the first product type from a product database based on the first product identifier; identify a second attribute advertised by the first promotional tag based on a second set of features extracted from the first promotional tag; and detect a deviation between the first shelf tag and the first promotional tag based on a conflict between the first attribute and the second attribute.

Furthermore, in this implementation, the computer system can detect the conflict based on an erroneous nutritional value advertised on the promotional tag. More specifically, the computer system can: retrieve a first attribute of a first product type from the product database by—based on a first product identifier—retrieving the first attribute as a first nutritional value of the first product type from the product database; and identify the second attribute advertised by the first promotional tag by—based on the second set of features—identifying the second attribute as a second nutritional value advertised by the first promotional tag; and detect the deviation between the first shelf tag and the first promotional tag by detecting the deviation between the first shelf tag and the first promotional tag based on a conflict between the first nutritional value and the second nutritional value.

In another implementation, the computer system can detect a temporal conflict between a promotion status advertised by a promotional tag associated with a product type and a current promotion status of the product type—that is, a temporal conflict indicating that a promotion date or date range advertised by the promotional tag is incorrect or has already expired. More specifically, the computer system can: access the image of the inventory structure by accessing the image of the inventory structure captured on a current date; retrieve the current promotion status assigned to the first product type by retrieving the first promotion status specifying a date range for a promotion assigned to the first product type; detect the conflict between the first promotion status and the current promotion status by detecting the conflict in response to the current data falling outside of the date range for the promotion; and generate the notification to investigate the first promotional tag at the first slot by generating the notification to remove the first promotional tag from the first slot.

11.3 Unknown Promotional Tag Data

Furthermore, if the computer system detects a promotional tag in a position on the first shelf face corresponding to the first slot on the inventory structure and if a promotion is currently active for this first slot but, if the computer system fails to read promotion details—such as with more than a threshold confidence—from the first promotional tag depicted in the image (e.g., due to an orientation of or glare across the first promotional tag), then the computer system can instead predict accuracy of the first promotional tag based on a previous promotional state of the first slot and/or a previous location of the promotional tag relative to the first slot or relative to the first shelf tag.

For example, if promotion details on the first promotional tag are not readable from the image, the computer system can extract a previous position of an upper section of the promotional tag relative to a reference feature on the inventory structure (e.g., the shelf tag for the corresponding slot) extracted from a previous image of the inventory structure—captured by the robotic system—in which content on the promotional tag was readable by the computer system. In this example, the computer system can then implement computer vision techniques to verify that the reference feature is unchanged from the previous image to the current image of the inventory structure. Then, if the reference feature differs between the previous image to the current image of the inventory structure, the computer system can dispatch a store associate to the inventory structure to straighten and verify the first promotional tag at the first slot (or replace the first promotional tag if torn, bent, misshapen in some way such that it is no longer readable by a customer).

Conversely, if the reference feature is sufficiently unchanged from the previous image to the current image of the inventory structure, the computer system can: extract a current position of the upper section of the promotional tag relative to the reference feature from the current image of the inventory structure; and compare this current position of the upper section of the promotional tag relative to the reference feature extracted from the current image to the previous position of the upper section of the promotional tag relative to the reference feature extracted from the previous image. Thus, if these relative positions of the promotional tag and the reference feature differ (e.g., by more than an optical measurement error from images captured by the robotic system), the computer system can predict that the promotional tag was changed since it was last read by the computer system. Accordingly, the computer system can dispatch a store associate to the inventory structure to straighten and manually verify the promotional tag.

However, if these relative positions of the promotional tag and the reference feature are sufficiently similar, the computer system can predict that the promotional tag was unchanged since it was last read by the computer system. Accordingly, the computer system can: retrieve published promotion details read from the promotional tag depicted in the previous image of the inventory structure; and execute methods and techniques described above to verify the promotional state of the slot or to prompt a store associate to replace this promotional tag based on alignment between these published promotion details and promotion parameters currently assigned to the first slot.

In one variation, the computer system can also track a duration of time and/or a quantity of scan cycles completed by the robotic system over which this first promotional tag is not readable in images of the inventory structure captured by the robotic system. Then, if this duration of time exceeds a threshold duration (e.g., three days) and/or if this quantity of scan cycles exceeds a threshold quantity (e.g., six scan cycles), the system can dispatch a store associate to the inventory structure to straighten and manually verify the promotional tag.

11.4 Upcoming Promotion Conclusion

In another implementation, if the computer system verifies that published promotion data on the first promotional tag matches promotion parameters assigned to the first slot by the planogram or promotion schedule but if this promotion is scheduled to end in less than a threshold duration of time or around a time of a next scheduled restocking period in the store, the computer system can insert a prompt to remove the first promotional tag at the first slot into a global restocking list queued for this next scheduled restocking period in the store.

The computer system can then repeat the foregoing methods and techniques to verify alignment between promotional tags and promotion statuses of each other slot detected in the image of the inventory structure. The computer system can also repeat the foregoing methods and techniques to verify alignment between promotional tags and promotion statuses of slots detected in images of other inventory structures throughout the store and then update realograms of these inventory structures, update a global restocking list for the store, and/or selectively dispatch store associates to correct promotional tags throughout the store according to such alignments and misalignments.

12. Stock-Based Promotion Verification

In one variation, rather than compare published promotion data read from a promotional tag detected in the image to a promotion status assigned to a slot (or shelf tag) near this promotional tag, the computer system can instead: identify a product occupying this slot, such as described above; retrieve a promotion status of this promotion; and then implement the foregoing methods and techniques to verify alignment between published promotion data read from a nearby promotional tag and a promotion status of this particular product.

13. Point-of-Sale Promotion Alignment

One variation of the method S100 includes Block S190, which recites temporarily updating pricing data for the first product type in a point-of-sale system associated with the store according to the promotion status advertised by the first promotional tag. Generally, in Block S190, the computer system can update pricing and promotion information at a point-of-sale (or checkout) system in the store to reflect a promotional tag error during an intermediate time between detection of the promotional tag error and correction of this promotional tag error by a store associate. Therefore, by temporarily coordinating point-of-sale data with an incorrect promotional tag deployed in the store, the computer system can align point-of-sale data to customer pricing expectation set by this incorrect promotional tag.

In one example, the computer system reads a "3-for-1" promotion on a promotional tag—near a slot assigned to a particular product—in an image recently captured by the robotic system, but verifies that the promotion status assigned to this particular product by the planogram is "2-for-1." Accordingly, the computer system dispatches a store associate to replace this promotional tag with a corrected "2-for-1" promotional tag. However, from the time the computer system detects this error up to a buffer time (e.g., thirty minutes) following confirmation from the store associate that the particular promotional tag was replaced, the computer system can temporarily update the point-of-sale system in the store to implement a "3-for-1" promotion for all units of the particular product brought to a checkout counter at the store.

Thus, the computer system can align sales data implemented by the point-of-sale system in the store to reflect expectations of patrons who may have selected products for purchase in light of promotion parameters indicated in erroneous promotional tags throughout the store. Therefore, the computer system can reduce or eliminate friction between patrons, store associates, and/or the point-of-sale system in the store and improve average patron experience in the store by: predicting patron expectations based on published promotion data read from images of promotional tags throughout the store; and aligning pricing and promotion data implemented by the point-of-sale system in the store to these predicted expectations until a time that erroneous promotional tags are corrected by store associates.

Additionally, in one implementation, the computer system can dispatch a robotic system to confirm that the incorrect promotional tag has been replaced by a corrected promotional tag, and subsequently the computer system can update the point-of-sale system in the store to reflect the promotion status advertised by the corrected promotional tag, thereby ensuring that the initial error has been fully corrected throughout the store, that an additional prompt does not need to be generated and transmitted to a store associate to replace the erroneous promotional tag, and that pricing and promotion data is consistent between advertised information and the point-of-sale system in the store.

More specifically, after detecting the initial promotional tag error in a first image captured, the computer system can: generate a prompt to replace the first promotional tag with a second promotional tag at the first slot, the second promotional tag correcting the difference; and transmit the prompt to a computing device associated with a store associate. Subsequently, the computer system can: dispatch a robotic system to capture a second image of the inventory structure; detect the first shelf tag on the inventory structure in the second image; detect a second promotional tag on the inventory structure in the second image; extract a set of features from the second promotional tag detected in the image; associate the second promotional tag with the first shelf tag; detect correspondence between the first shelf tag and the second promotional tag based on alignment of a set of features extracted from the shelf tag and the set of features extracted from the second promotional tag; in response to detecting correspondence between the first shelf tag and the second promotional tag, verify replacement of the first promotional tag by the second promotional tag; and update pricing data for the first product type in the point-of-sale system according to a second promotion status advertised by the second promotional tag.

The computer system can implement similar methods and techniques to update the point-of-sale system to reflect prices of products indicated on erroneous shelf tags detected in images captured by the robotic system.

14 Fixed Camera

In one variation of the method S100, the computer system can access photographic images from a set of fixed cameras positioned at various locations within the store and facing particular inventory structures throughout the store. The computer system can implement methods and techniques described above to detect a shelf tag at a first slot on a first shelf face of an inventory structure in an image captured by a fixed camera positioned such that a field of view of the camera includes the inventory structure (or at least a portion of the inventory structure containing the first slot and the first shelf tag).

By accessing a stream of photographic images of an inventory structure from a fixed camera, such as captured once per minute by the fixed camera, the computer system can detect a promotional tag at a particular slot on the inventory structure very soon after installation, such as with a maximum latency of one minute. Accordingly, the computer system can implement methods and techniques described herein to verify an accuracy and/or a validity of the promotional tag. Upon detecting a conflict between published promotion data read from the promotional tag and current promotion data, the computer system can generate and transmit a prompt or notification to a computing device of a store associate to investigate the promotional tag and potentially take correction action to remove and/or replace the promotional tag.

For example, the computer system can: detect and track a promotional tag in a sequence of images captured by a fixed camera over time (e.g., days); detect damage of this promotional tag based on a change in its geometry or detect loss of the promotional tag based on its absence from the inventory structure detected in a next image received from the fixed camera; and quickly dispatch a store associate to fix and/or replace the promotional tag. In another example, the computer system can detect presence of a store associate—within a particular aisle—in an image received from the fixed camera and/or by tracking a location of a computing device carried by the store associate. If an inventory structure in this particular aisle is flagged as containing an erroneous promotional tag, the computer system can transmit a prompt or notification to the store associate's computing device regarding presence and a slot address of the erroneous promotional tag while the store associate is present in the particular aisle, thereby enabling the store associate to quickly correct or verify the erroneous promotional tag.

14. Store Promotion Compliance

In one variation of the method S100, the computer system can evaluate a performance of a store based on its compliance with promotion advertising and promotion schedules, which can inform a store team and/or a corporate team of areas needing improvement within the store. For example, the computer system can evaluate the store's participation in a promotion (e.g., if the store displayed promotional tags for ongoing promotions), a timeliness and/or efficiency of the promotional tags being placed on and/or being taken down from the corresponding inventory structures based on the promotion schedule of a promotion, a complete or incomplete execution of placing or taking down promotional tags from inventory structures (e.g., if promotional tags were placed at more than one location if a corresponding product type is located at more than one location in the store), an accuracy of the positioning of promotional tags on the appropriate inventory structures and/or at the corresponding slots on the inventory structures (e.g., if the promotional tags are placed within a threshold distance to a corresponding shelf tag and/or a corresponding slot for the product type), a visibility of the promotional tags within the store (e.g., the promotional tags are orientated in such a way that they are readable by a customer and/or robotic system and/or are not bent, torn, or misshapen in some way), a timeliness and/or efficiency of restocking a product type with an ongoing promotion and corresponding promotional tag, and other relevant metrics for tracking promotional states of slots in inventory structures and improving customer experience of shopping within the store. The computer system can provide metrics to the store team and/or corporate team and recommend areas for improvement, if any.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for tracking price states of slots in inventory structures within a facility comprising:

accessing an image of an inventory structure within the facility, the image captured by an optical sensor located within the facility;

detecting a first slot in the inventory structure depicted in the image;

identifying a first product type assigned to the first slot;

accessing a first current price status from a product database, the first current price status assigned to the first product type;

detecting a first set of features in the image, the first set of features representing a first tag on the inventory structure, the first tag associated with the first slot;

interpreting a first price status advertised by the first tag based on the first set of features;

detecting a conflict between the first price status and the first current price status; and in response to detecting the conflict, generating an electronic flag comprising a request to investigate the first slot.

2. The method of claim 1, wherein accessing the image of the inventory structure comprises accessing the image captured by the optical sensor integrated within a fixed camera and defining a field of view that intersects the inventory structure.

3. The method of claim 1, further comprising dispatching a robotic system, comprising the optical sensor located within the facility, to:

autonomously navigate along the inventory structure; and during a first scan cycle, capture the image of the inventory structure via the optical sensor.

4. The method of claim 1:

wherein detecting the first set of features representing the first tag comprises detecting a distribution of feature types in a first region of the image depicting the first tag; and wherein interpreting the first price status advertised by the first tag comprises:

accessing a set of tag templates;

matching the first tag to a first tag template, in the set of tag templates, based on the distribution of feature types;

retrieving a target price status location and a price status interpreter for the first tag template;

identifying a target feature, in the set of features, located in the target price status location on the first tag; and interpreting the first price status advertised by the first tag based on the target feature and the price status interpreter.

5. The method of claim 1:

wherein accessing the first current price status assigned to the first product type comprises accessing a target price format assigned to the first product type;

wherein interpreting the first price status advertised by the first tag comprises interpreting a first price format advertised by the first tag; and wherein detecting the conflict between the first price status and the first current price status comprises detecting a deviation between the first price format and the target price format.

6. The method of claim 1:

wherein detecting the first set of features representing the first tag comprises detecting the first set of features representing the first tag comprising a non-electronic shelf tag; and further comprising, in response to detecting the conflict:

generating a print file for a replacement shelf tag based on the first price status, the replacement shelf tag comprising a replacement price status that corresponds to the current price status; and triggering a printer to queue the replacement shelf tag for printing.

7. The method of claim 1, further comprising:
scanning a digital product catalog defining a population of product types stocked in the facility for current price statuses of the population of product types; and
compiling current price statuses for the population of product types into the product database.

8. A method for tracking states of slots in inventory structures within a facility comprising:
accessing an image of an inventory structure within the facility, the image captured by an optical sensor located within the facility;
detecting a set of shelf faces in the inventory structure in the image;
detecting a first set of features on a shelf tag on a first shelf face, in the set of shelf faces, in the image;
identifying a slot above the first shelf face based on a position of the shelf tag in the image;
identifying a product type assigned to the slot based on the first set of features;
retrieving a current price status from a product database, the current price status associated with the product type;
detecting an absence of a tag indicating the current price status at the slot in the image; and
in response to detecting the absence of the tag, generating an electronic flag comprising a request to investigate the slot on the inventory structure.

9. The method of claim 8:
wherein generating the electronic flag comprising the request to investigate the slot comprises:
generating a prompt to install the tag onto the first shelf face adjacent the first slot on the inventory structure; and
transmitting the prompt to a computing device accessible to a facility associate.

10. The method of claim 8:
further comprising dispatching a robotic system, comprising the optical sensor located within the facility, to:
autonomously navigate along the inventory structure; and
by the optical sensor, capture a sequence of photographic images of regions of the inventory structure during a scan cycle; and
wherein accessing the image of the inventory structure comprises assembling the sequence of photographic images into the image of the inventory structure.

11. The method of claim 8, wherein accessing the image comprises accessing the image captured by the optical sensor integrated within a fixed camera and defining a field of view that intersects the inventory structure.

12. A method for tracking states of slots in inventory structures within a facility comprising:
accessing an image of an inventory structure within the facility, the image captured by an optical sensor located within the facility;
detecting a first slot in the inventory structure depicted in the image;
identifying a first product type assigned to the first slot;
accessing a current price status assigned to the first product type from a product database;
detecting a first set of features in the image, the first set of features representing a first tag on the inventory structure, the first tag associated with the first slot;
interpreting a first price status advertised by the first tag based on the first set of features;
detecting a conflict between the first price status and the current price status; and
in response to detecting the conflict:
updating pricing data for the first product type in a point-of-sale system associated with the facility according to the first price status advertised by the first tag; and
generating an electronic flag comprising a request to investigate the first tag at the first slot.

13. The method of claim 12, further comprising, in response to receipt of confirmation of replacement of the first tag with a second tag advertising the current price status, reverting pricing data for the first product type in the point-of-sale system according to the current price status advertised by the second tag.

14. The method of claim 1, further comprising updating pricing data for the first product type in a point-of-sale system associated with the facility according to the first price status advertised by the first tag.

15. The method of claim 2, further comprising:
accessing a second image of the inventory structure captured by the fixed camera;
detecting a facility associate in the second image; and
in response to detecting the facility associate in the second image, transmitting a notification associated with the electronic flag to a computing device accessible to the facility associate.

16. The method of claim 1:
wherein detecting the first set of features representing the first tag on the inventory structure comprises detecting the first set of features representing the first tag on the inventory structure, the first tag comprising an electronic shelf tag; and
further comprising, in response to detecting the conflict, transmitting a price data file comprising a replacement price status, corresponding to the first current price status, to the electronic shelf tag.

17. The method of claim 12, further comprising:
writing the electronic flag to a global restocking list; and
distributing the global restocking list to computing devices accessible to facility associates during a next scheduled restocking period in the facility.

18. The method of claim 12:
further comprising dispatching a robotic system, comprising the optical sensor and located within the facility, to:
autonomously navigate along the inventory structure; and
by the optical sensor, capture a sequence of photographic images of regions of the inventory structure during a scan cycle; and
wherein accessing the image of the inventory structure comprises assembling the sequence of photographic images into the image of the inventory structure.

19. The method of claim 12, wherein accessing the image of the inventory structure comprises accessing the image captured by the optical sensor, the optical sensor integrated within a fixed camera and defining a field of view that intersects the inventory structure.

20. The method of claim 12, wherein generating the electronic flag to investigate the first tag at the first slot comprises:
generating a prompt to replace the first tag with a second tag at the first slot, the second tag comprising a replacement price status that corresponds to the first current price status; and
transmitting the prompt to a computing device accessible to a facility associate.

* * * * *